Figure 1:
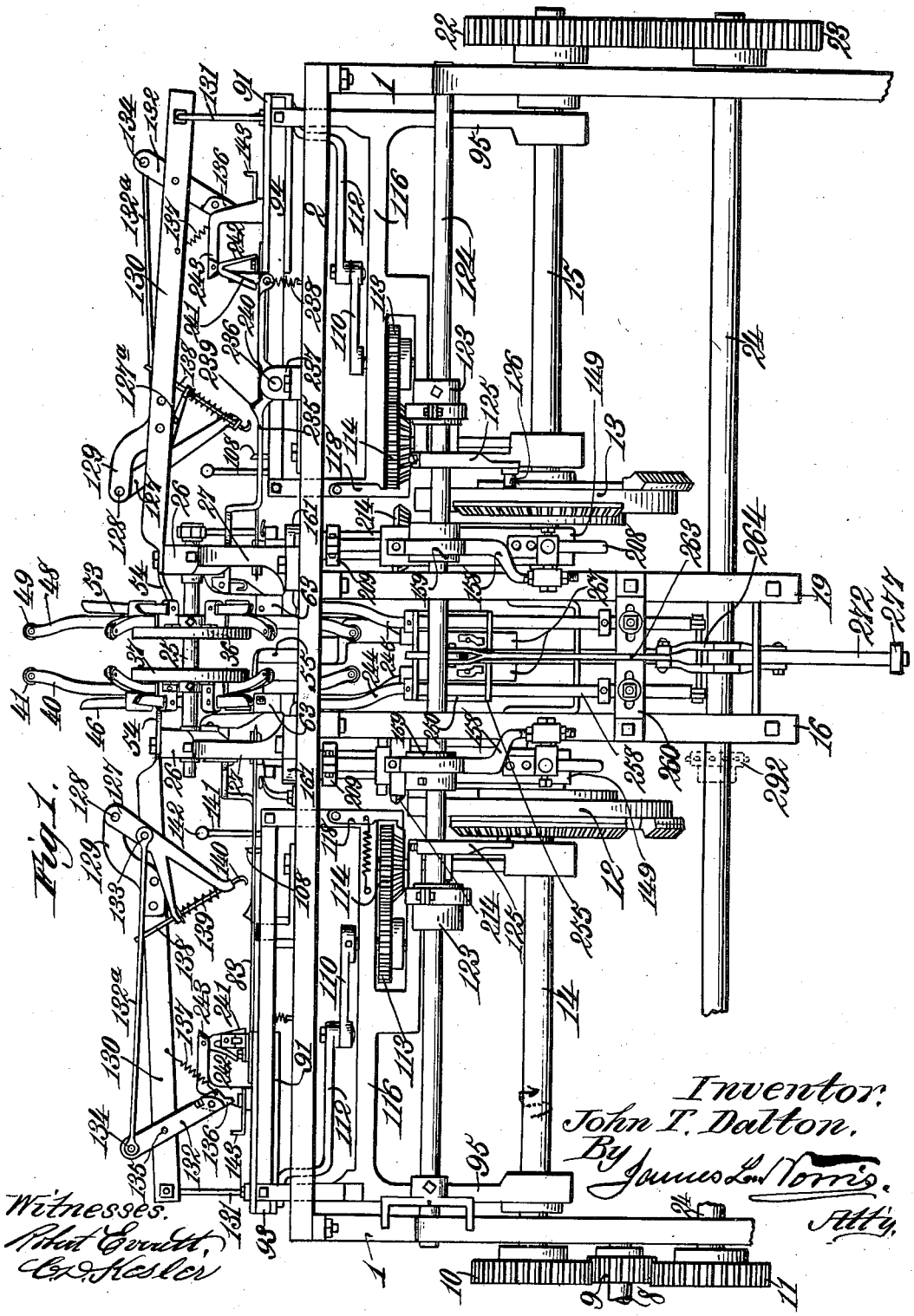

No. 862,057. PATENTED JULY 30, 1907.
J. T. DALTON.
BAG STRINGING MACHINE.
APPLICATION FILED JULY 16, 1906.

13 SHEETS—SHEET 3.

Witnesses
Inventor
John T. Dalton,
By James L. Norris,
Atty.

No. 862,057. PATENTED JULY 30, 1907.
J. T. DALTON.
BAG STRINGING MACHINE.
APPLICATION FILED JULY 16, 1906.

13 SHEETS—SHEET 4.

Witnesses.
Robert Emmitt,
C. D. Kesler.

Inventor:
John T. Dalton,
By James L. Norris.
Atty.

No. 862,057. PATENTED JULY 30, 1907.
J. T. DALTON.
BAG STRINGING MACHINE.
APPLICATION FILED JULY 16, 1906.
13 SHEETS—SHEET 5.
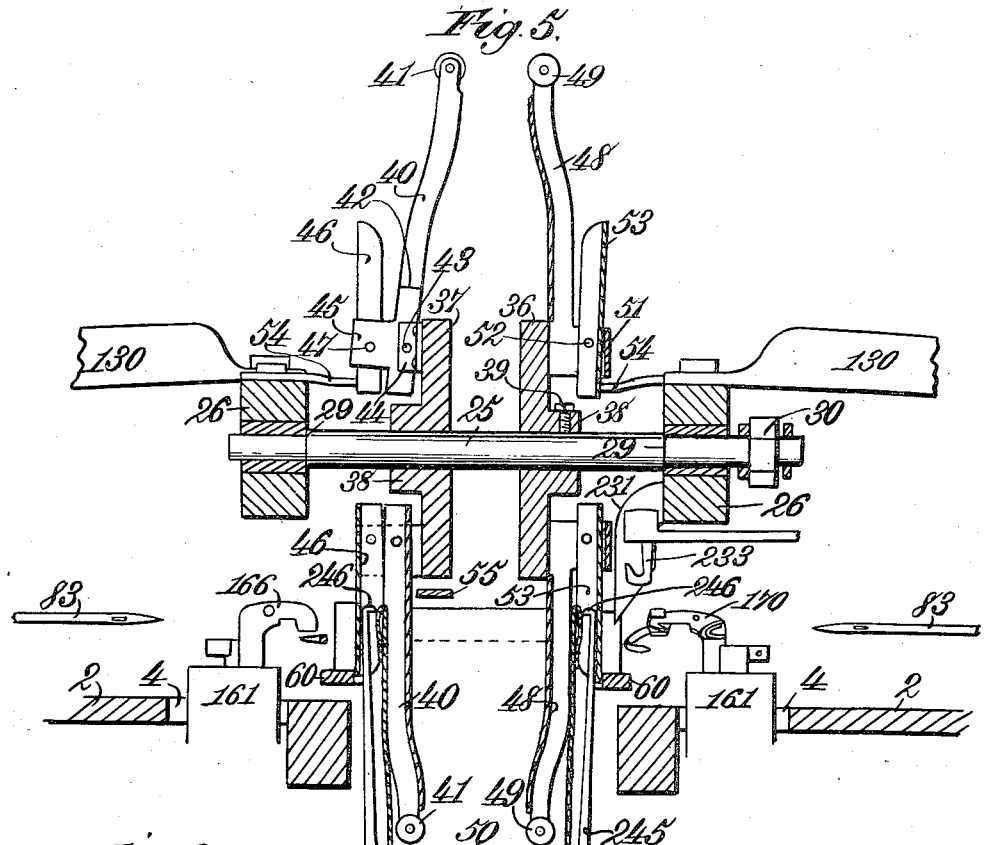
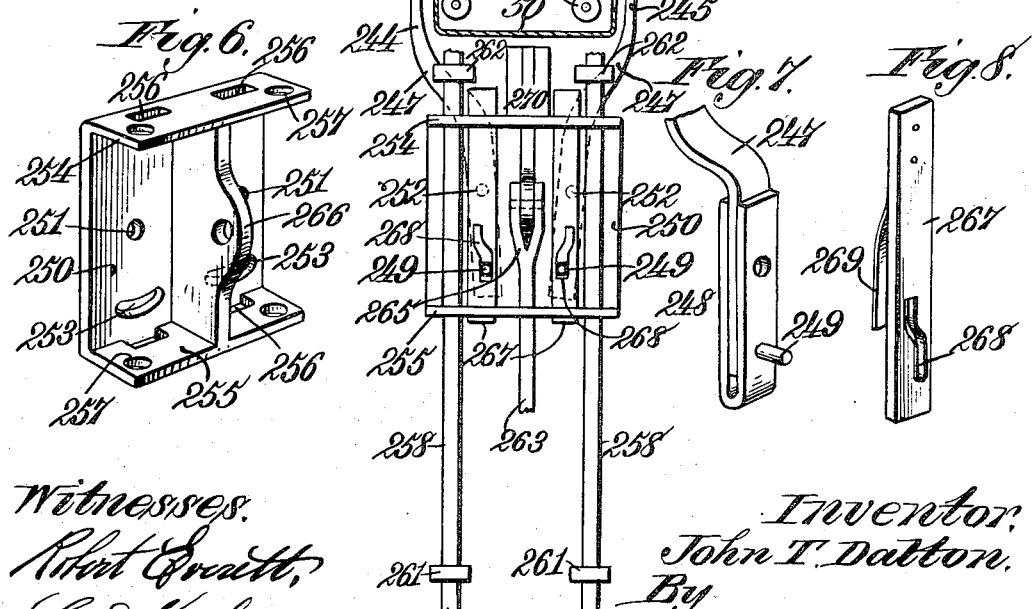
Witnesses.
Robert Pratt,
C. D. Hesler
Inventor,
John T. Dalton,
By James L. Norris.
Atty.

No. 862,057. PATENTED JULY 30, 1907.
J. T. DALTON.
BAG STRINGING MACHINE.
APPLICATION FILED JULY 16, 1906.
13 SHEETS—SHEET 6.
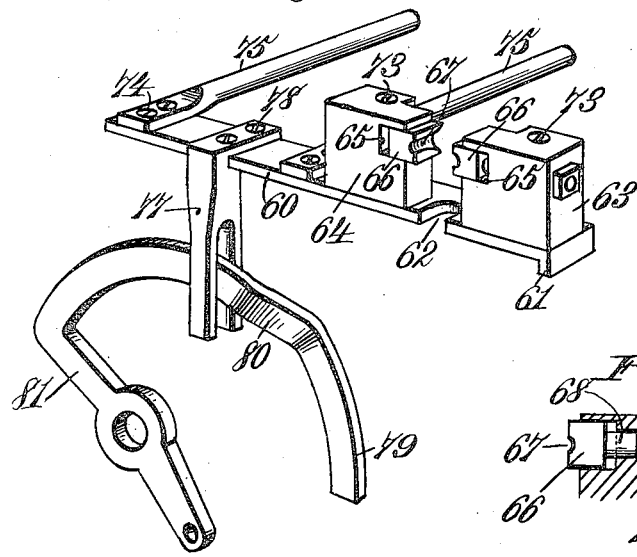
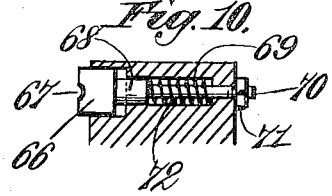
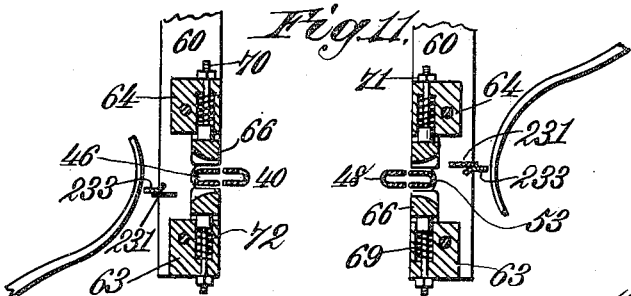
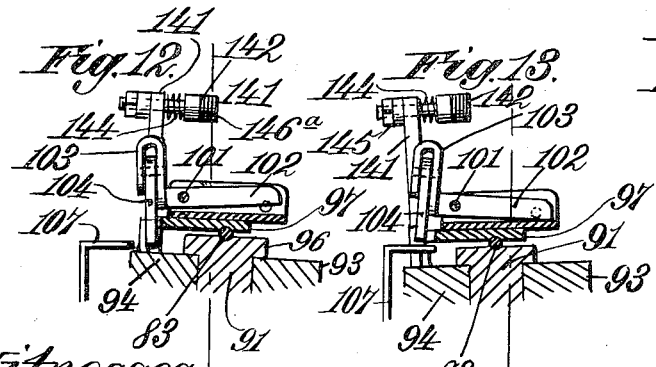
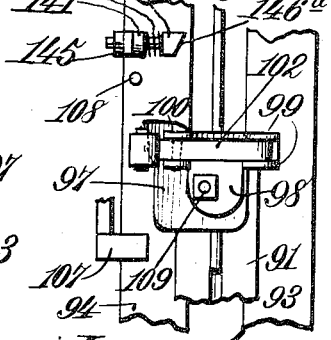
Witnesses.
Inventor.
John T. Dalton.
By James L. Norris.

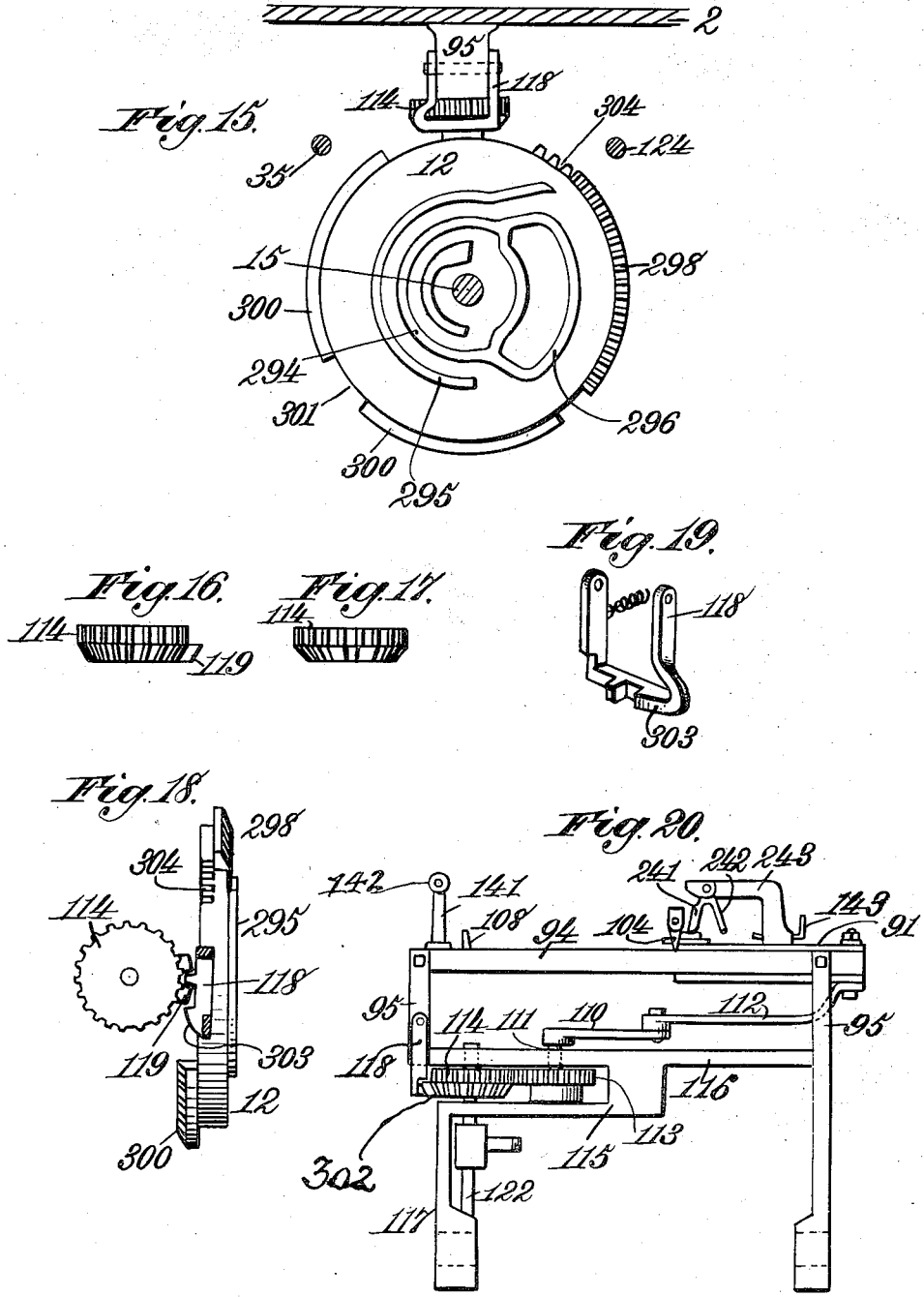

No. 862,057. PATENTED JULY 30, 1907.
J. T. DALTON.
BAG STRINGING MACHINE.
APPLICATION FILED JULY 16, 1906.
13 SHEETS—SHEET 8.
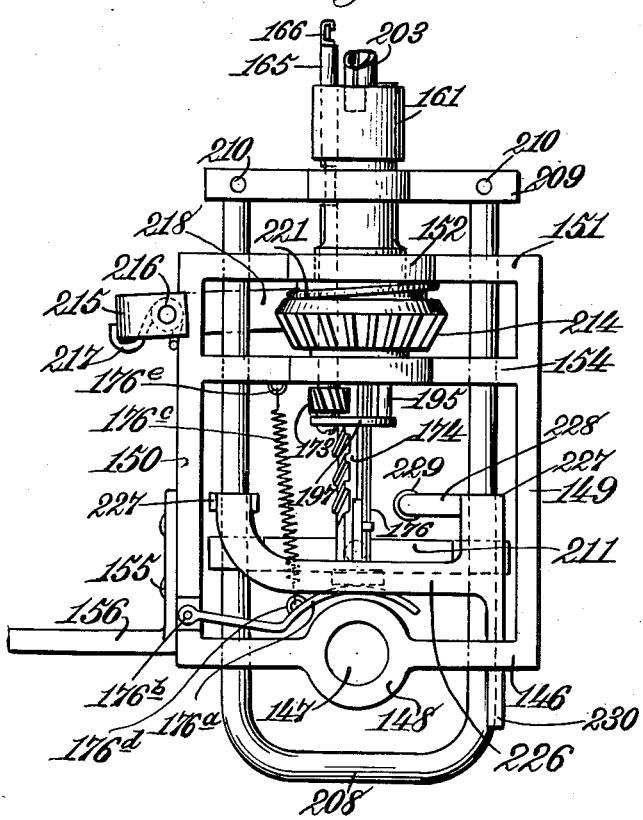
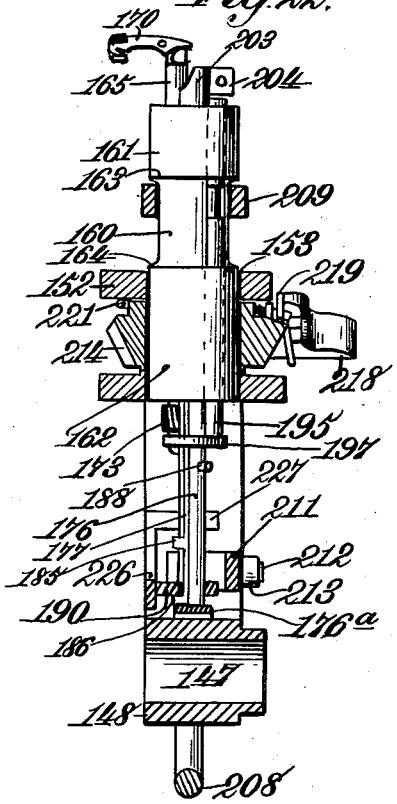
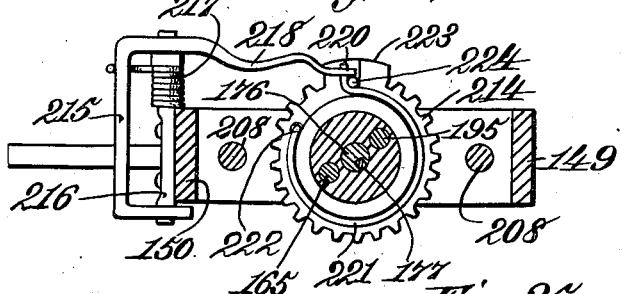
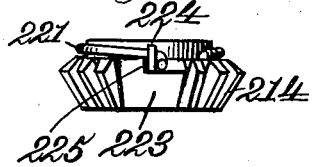
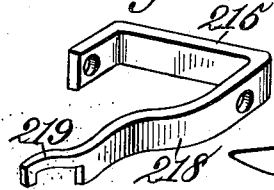
Witnesses,
Robert Everitt,
G. D. Kesler
Inventor,
John T. Dalton,
By James L. Norris,
Atty.

No. 862,057. PATENTED JULY 30, 1907.
J. T. DALTON.
BAG STRINGING MACHINE.
APPLICATION FILED JULY 16, 1906.
13 SHEETS—SHEET 9.
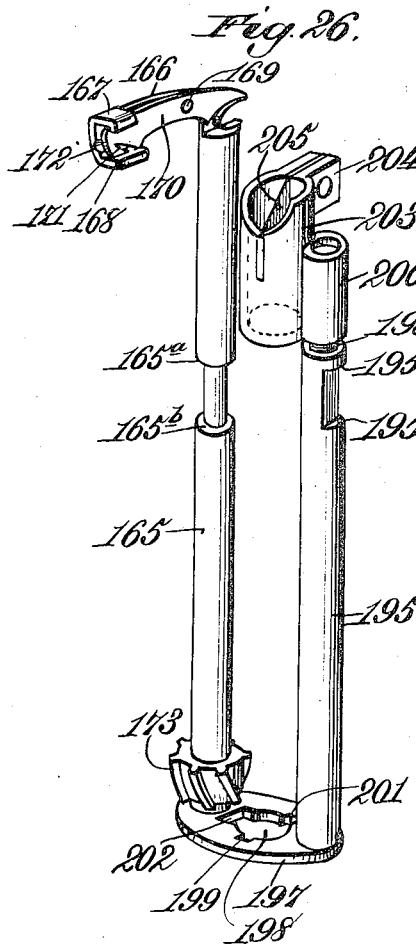
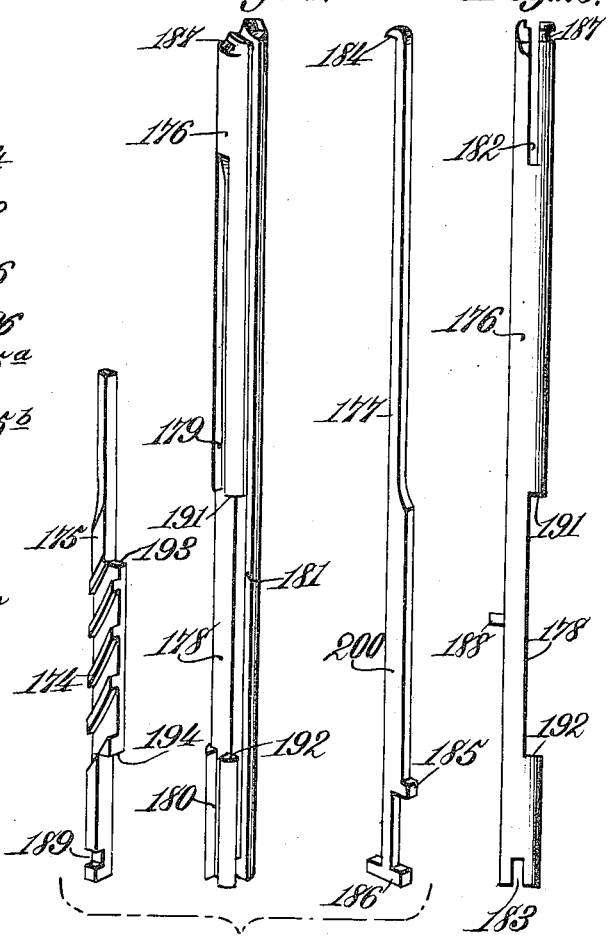
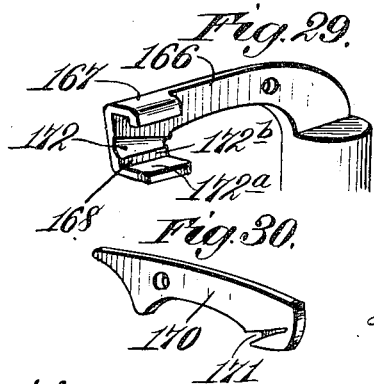
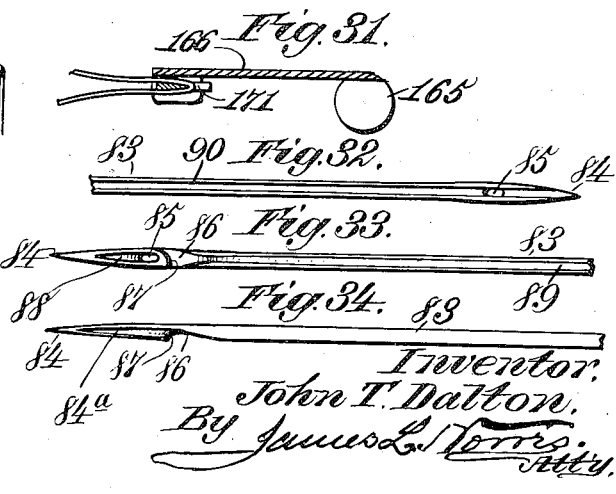
Witnesses:
Robert Everitt,
C. A. Kesler
Inventor:
John T. Dalton,
By James L. Norris
Atty.

No. 862,057. PATENTED JULY 30, 1907.
J. T. DALTON.
BAG STRINGING MACHINE.
APPLICATION FILED JULY 16, 1906.
13 SHEETS—SHEET 10.
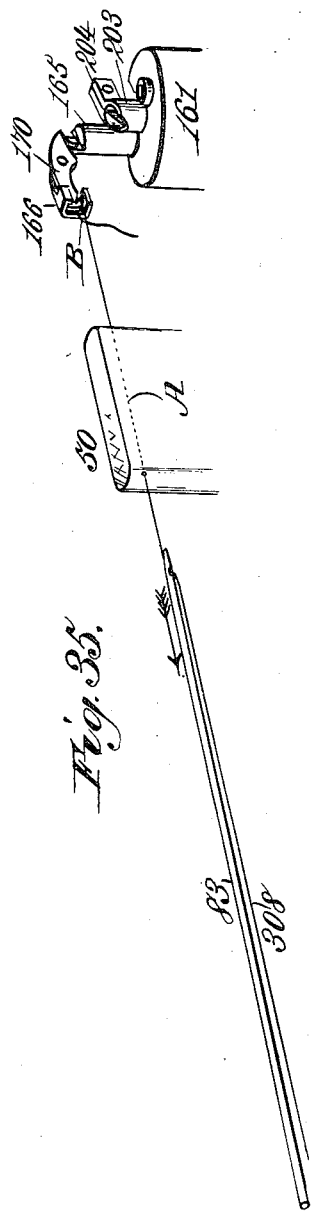
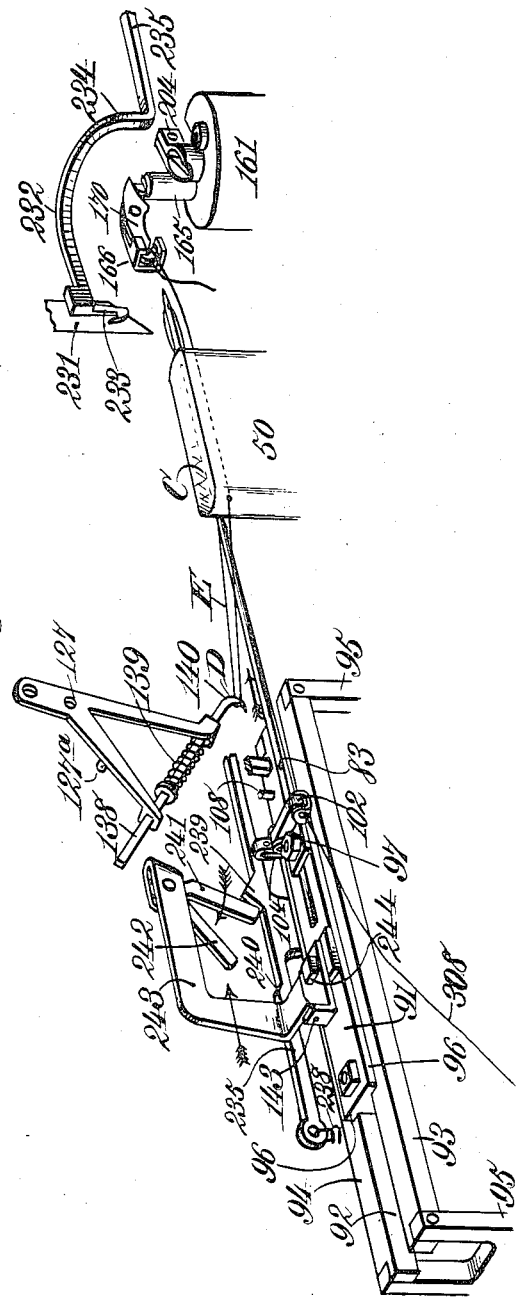
Witnesses.
Robt Garrett
Cy Kesler
Inventor:
John T. Dalton.
By James L. Norris.
Atty.

No. 862,057.

PATENTED JULY 30, 1907.

J. T. DALTON.
BAG STRINGING MACHINE.
APPLICATION FILED JULY 16, 1906.

13 SHEETS—SHEET 11.

Witnesses
Robert Everett
C. D. Kesler

Inventor
John T. Dalton
By James L. Norris
Atty.

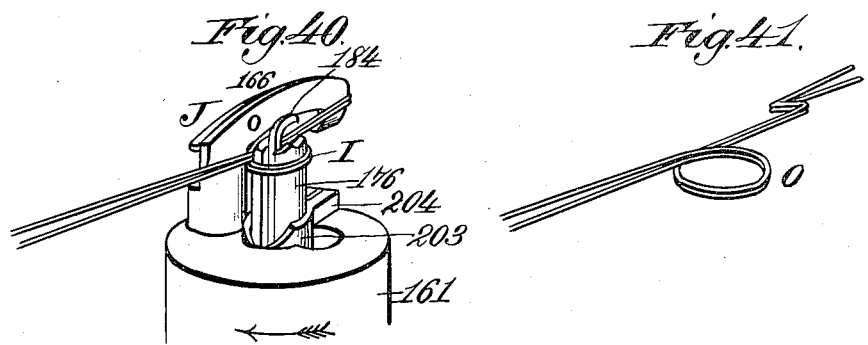
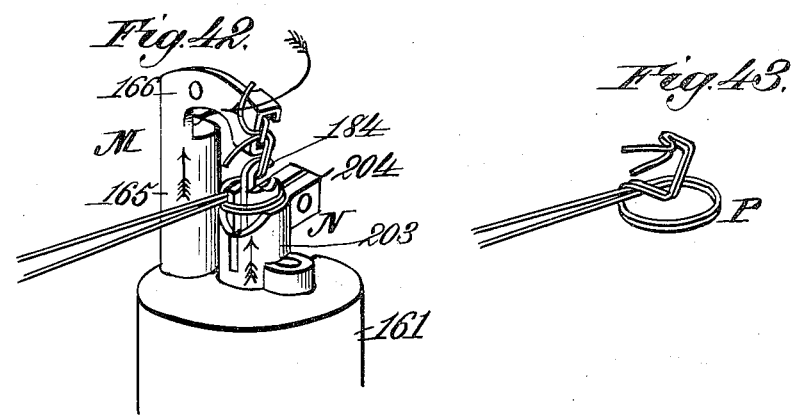
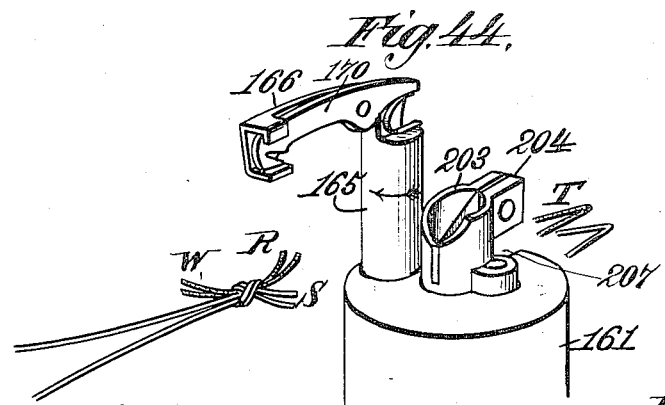

No. 862,057. PATENTED JULY 30, 1907.
J. T. DALTON.
BAG STRINGING MACHINE.
APPLICATION FILED JULY 16, 1906.
13 SHEETS—SHEET 13.
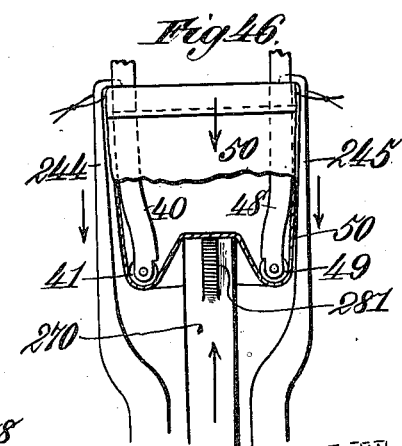
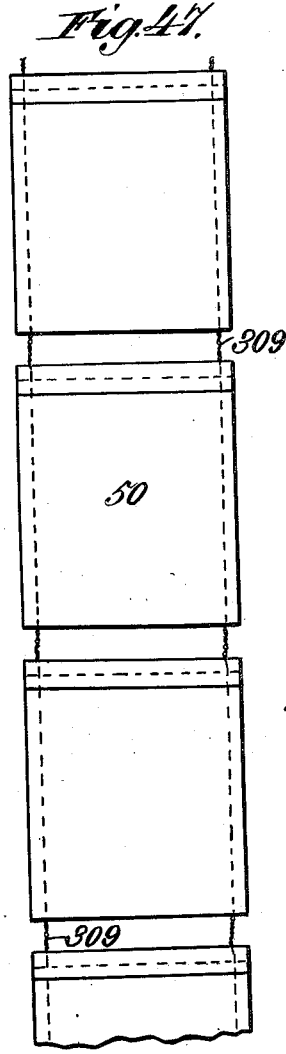
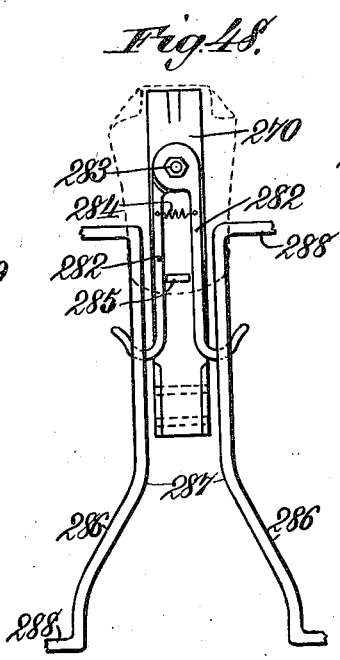
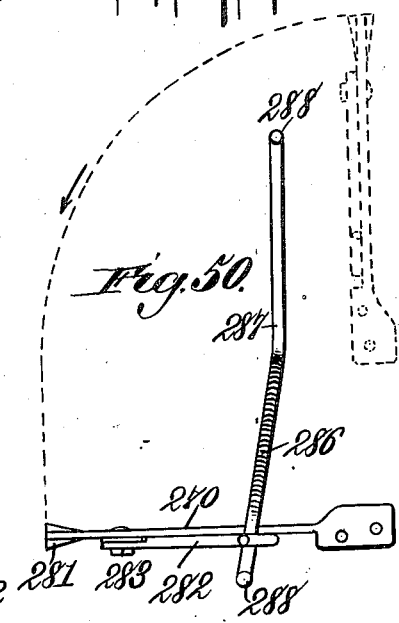
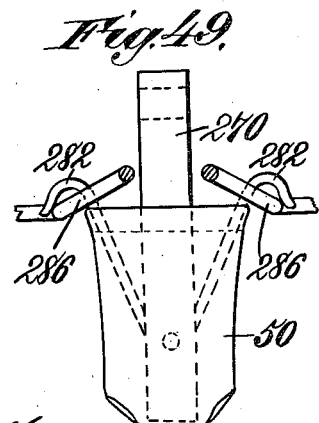
Witnesses.
Robert Everitt.
C. D. Kesler.
Inventor.
John T. Dalton,
By James L. Norris.
Atty.

UNITED STATES PATENT OFFICE.

JOHN T. DALTON, OF VIRGILINA, VIRGINIA, ASSIGNOR OF ONE-HALF TO WALTER H. CROWELL, OF VIRGILINA, VIRGINIA.

BAG-STRINGING MACHINE.

No. 862,057.  Specification of Letters Patent.  Patented July 30, 1907.

Application filed July 16, 1906. Serial No. 326,416.

*To all whom it may concern:*

Be it known that I, JOHN T. DALTON, a citizen of the United States, residing at Virgilina, in the county of Halifax and State of Virginia, have invented new and useful Improvements in Bag-Stringing Machines, of which the following is a specification.

This invention relates to bag-stringing machines, and the object thereof is to provide a machine of such class for inserting in a bag at the mouth end thereof, a pair of strings extending in an opposite direction with respect to each other, and which are adapted when pulled in opposite directions, with respect to each other, to cause the closing of the mouth of the bag.

The machine is particularly adapted for use in connection with the stringing at the mouth end thereof, of the form of fabric-tobacco bag now in general use, although the machine can be used for any form of bag for which it may be found applicable.

The invention further aims to provide a machine of the class referred to which will be automatic and accurate in its action, strong, durable, efficient in its use, having the various mechanisms thereof adjustable, which will permit in a convenient manner the removal of an injured element without taking apart the entire machine, and comparatively inexpensive to set up.

With the foregoing and other objects in view, the invention consists of the novel construction, combination and arrangement of parts hereinafter more specifically referred to and illustrated in the accompanying drawings, wherein is shown the preferred embodiment of the invention; but it is to be understood that changes, variations and modifications can be resorted to which come within the scope of the claims hereunto appended.

Figure 2:
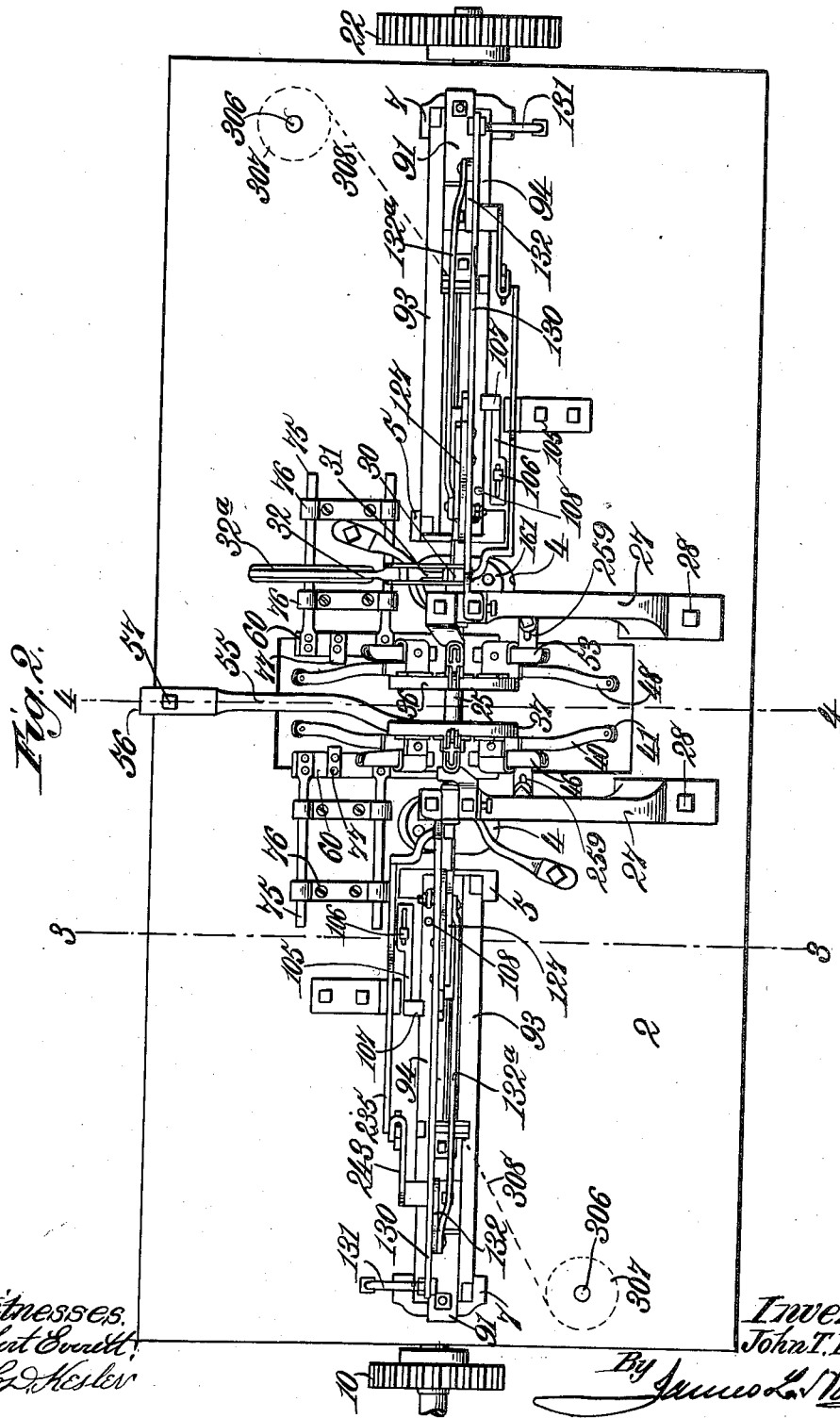
Figure 3:
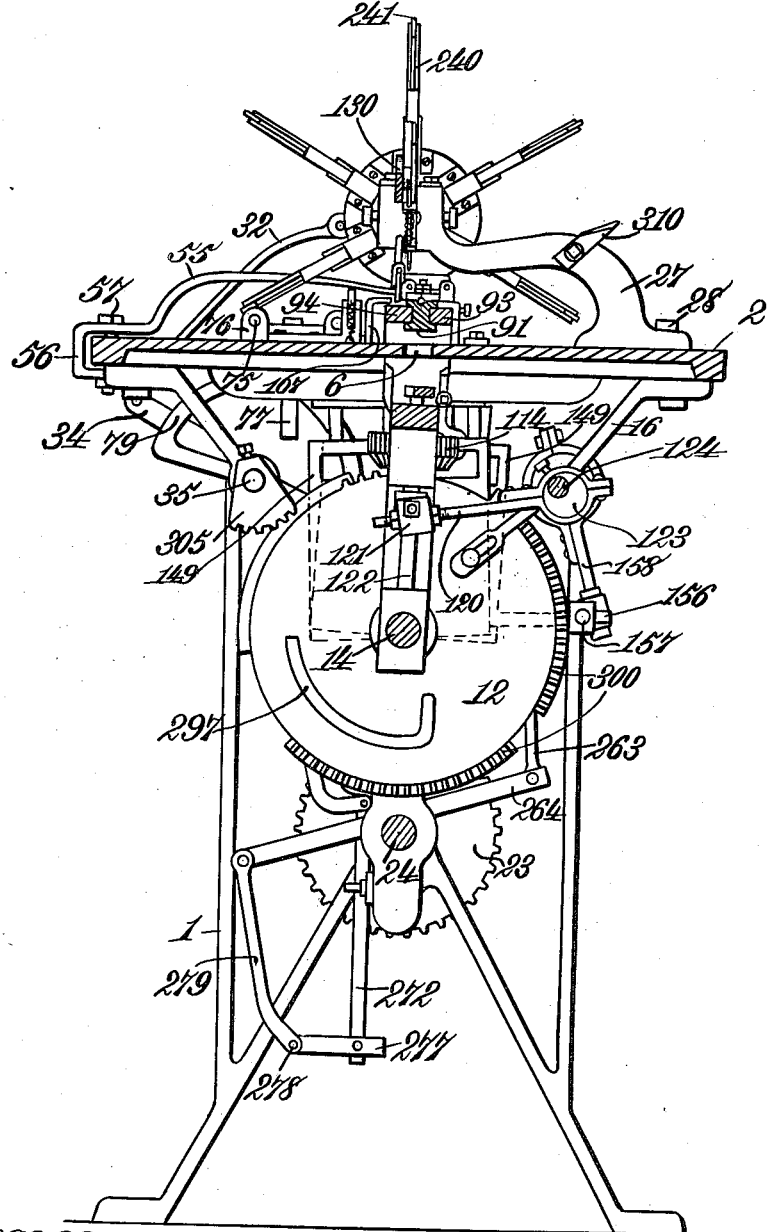
Figure 4:
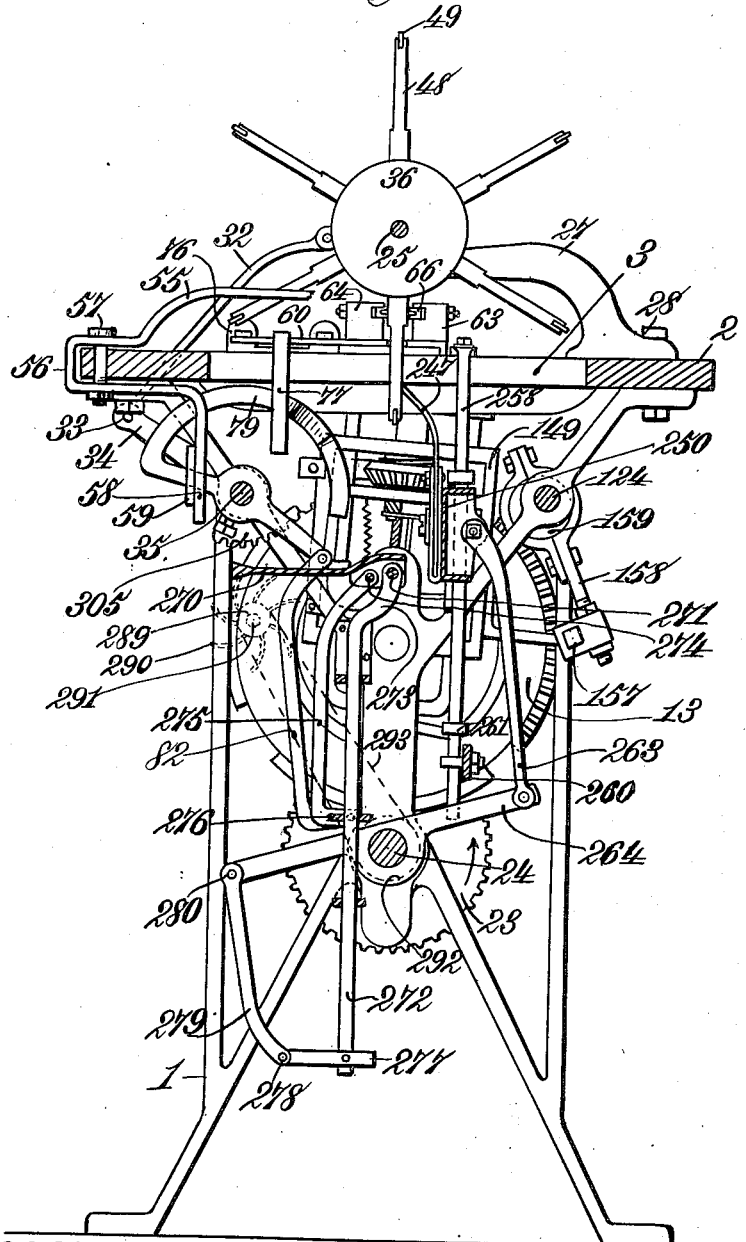
Figure 37:
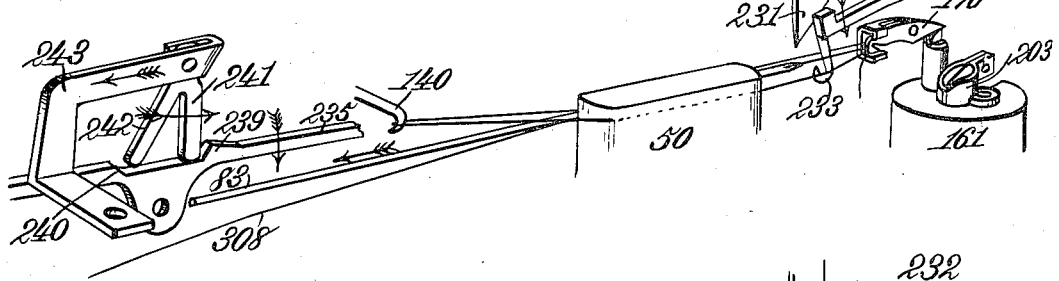
Figure 38:
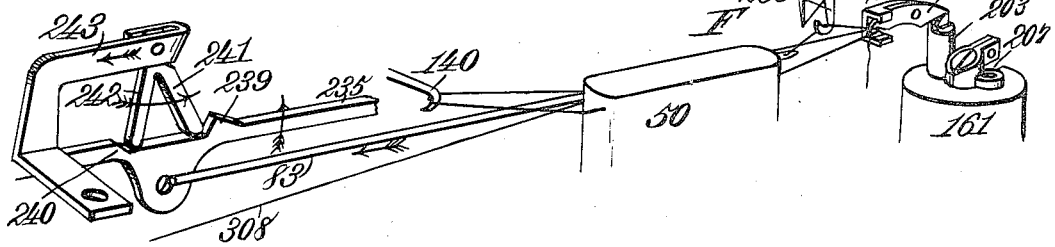
Figure 39:
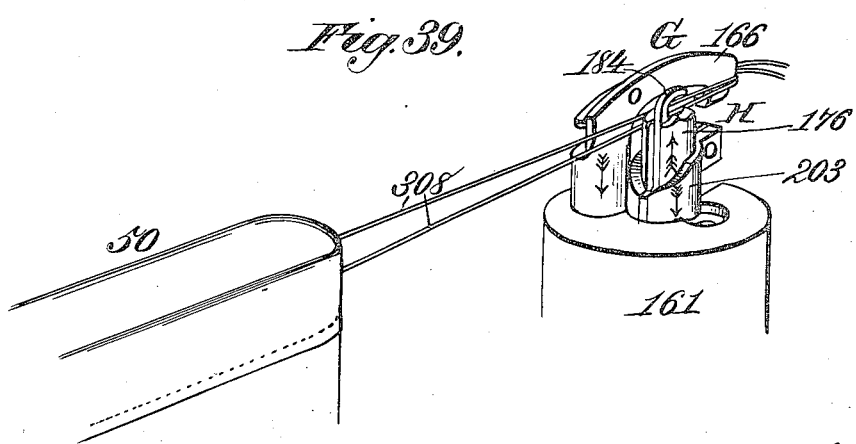

In describing the invention in detail, reference is had to the accompanying drawings, wherein like reference characters denote corresponding parts throughout the several views, and in which:

Figure 1 is a side elevation of a bag-stringing machine in accordance with this invention, the supporting frame being broken away; Fig. 2 is a top plan view thereof; Fig. 3 is a horizontal section on line 3—3, Fig. 2; Fig. 4 is a like view on line 4—4, Fig. 2; Fig. 5 is a longitudinal section at the center of the machine, various parts being broken away; Figs. 6, 7 and 8 are details of a part of the operating means for the bag-strippers; Fig. 9 is a perspective view of one pair of the needle guides and the shifting means therefor; Fig. 10 is a sectional detail of one of the needle guides; Fig. 11 is a sectional plan of the two pairs of needle guides; Figs. 12 and 13 are horizontal sections of the combined thread guide and thread and needle holder; Fig. 14 is a top plan view thereof; Fig. 15 is a face view of the combined cam and mutilated gear; Figs. 16, 17, 18 and 19 are details; Fig. 20 is a side view, showing the means for reciprocating the needle; Fig. 21 is a side elevation of one of the knotter mechanisms; Fig. 22 is a section of the knotter mechanism; Figs. 23, 24, 25, 26, 27, 28, 29, 30 and 31 are details of the knotter mechanism; Figs. 32, 33, and 34 are views of the needle; Figs. 35, 36, 37, 38 and 39 are views illustrating the various steps during the operation of inserting the string at the mouth of the bag; Figs. 40, 41, 42, 43 and 44 are views illustrating the operation of tying the knot; Fig. 45 is a view of one end of the bag, showing the position of the strings; Fig. 46 is a side elevation showing the arrangement of the strippers with respect to the bag; Fig. 47 shows one form of bag for which the machine can be used; Figs. 48, 49 and 50 illustrate the bag-turning and stretching device.

A bag-stringing machine in accordance with this invention comprises an adjustable and intermittently-operating bag-holding member, operating means therefor, a bag-tensioning device associating with the bag-holding member, two pair of needle guides, a shifting means therefor; a pair of reciprocatory and transversely-shiftable needles, means for transversely shifting the needles, a pair of reciprocatory combined thread-guide and thread and needle-holders, a pair of loopers, a pair of thread knotters, operating means therefor; a pair of thread cutters, operating means therefor; bag strippers, operating means therefor; a combined bag-turner and stretcher, operating means therefor; and a bag sweep.

The mechanisms referred to in the foregoing paragraph are so set up in relation to each other and operated at such time that when a bag is positioned so that the mouth end thereof is in the path of the needles, there will be inserted in that end of the bag so as to constitute after the operation of the knotter mechanism a pair of strings extending in an opposite direction with respect to each other, and which are adapted when pulled in an opposite direction with respect to each other to cause the closing of the mouth of the bag. After the knotter mechanism has operated upon the thread and the strings formed, the bag is turned, stretched and swept from the machine.

Referring to the drawings by reference characters, the machine comprises a frame 1 having a top 2 formed of a rectangular plate. Approximately centrally of the plate 2, a transversely-extending enlarged opening 3 is provided which permits of the operation of the bag-holding member and certain other elements of the machine, to be hereinafter referred to. At each side of the opening 3, transversely-extending openings 4, 5 and a longitudinally-extending opening 6 terminating in a laterally-extending opening 7, are provided. The openings 4 permit of the shifting of the knotters, to be hereinafter referred to, the openings 5, 7 permit of the shifting of the needles transversely of the machine frame and the openings 6 allows of the needles being reciprocated.

Journaled in one end of the frame is the operating shaft 8 which is suitably connected with a prime mover, not shown, and carries a pinion 9 which meshes with a gear 10 arranged above the pinion 9, and further meshes with a gear 11 arranged below the pinion 9. Through the medium of the pinion 9 and gear 10, the mechanisms for inserting one string are operated; and through the medium of the pinion 9 and gear 11, the mechanisms for the inserting of the other string are operated. The mechanisms for inserting one string are arranged at one side of the machine, and the mechanisms for inserting the other string are arranged at the other side of the machine. That is to say, the bag-holding member, to be hereinafter referred to, is positioned intermediate of the machine frame and to one side of said bag-holding element, the mechanisms for inserting one string are positioned; and at the other side of the said member, the mechanisms for inserting the other string are positioned. For the operation of certain mechanisms at one side of the bag-holding member, a combined cam and mutilated gear-wheel 12 is provided, this wheel 12 to be hereinafter more specifically referred to; and for the operation of certain of the mechanisms at the other side of the bag-holding member, a combined cam and mutilated gear-wheel 13 is provided. The wheel 13 will be hereinafter more specifically referred to. The wheel 12 is mounted near the inner end of a drive shaft 14 and the wheel 13 is mounted near the inner end of a drive shaft 15. The drive shaft 14 is journaled in the lower portion of the Y-shaped hanger 16 forming a part of the machine frame and in one end of the machine frame, and the said shaft 14 carries on its outer end the gear 10. The drive shaft 15 is journaled in the lower portion of the Y-shaped hanger forming part of the machine frame and in that end of the machine frame opposite to that in which the shaft 14 is journaled. The shaft 15 carries on its outer end a gear wheel 22 which meshes with a gear-wheel 23 carried on one end of the transmission shaft 24. The opposite end of the shaft 24 has fixed thereto, the gear 11. From the foregoing construction, it is evident that when the shaft 8 is operated, the shafts 14, 15 will be driven in an opposite direction with respect to each other; consequently imparting movement to the combined cam and mutilated gear wheels 12, 13.

*The bag-holding member;* Figs. 1, 2, 3, 4 and 5: The function of this member is to receive the bag from the operator, and then position the bag, with the mouth-end thereof in the path of the needles so that the threads can be inserted to form the strings. When the bag is mounted upon the member, it is inside-out, and after the strings have been inserted, the bag is removed from the holding member; and during such removal, it is turned rightside-out and stretched by the strippers and combined bag-turner and stretcher, to be hereinafter referred to. The bag when removed from the holder and turned rightside-out, has its corners tucked in, as illustrated in Fig. 49. This is the usual arrangement of tobacco bag before it is filled, as the tucked-in corners of the bag prevent, after the bag is filled, sharp corners. The bag-holding member comprises an intermittently-operable shaft 25 which is journaled in the bearings 26 mounted in the upper end of the hanger brackets 27. These brackets are fixed at their lower ends, as at 28, to the plate 2, and are of such length that they terminate at a point centrally of the plate 2. The shaft 25 is shouldered, as at 29, and one said shoulders 29 abut against the bearings 26, and one end of said shaft 25 projects from one of the brackets 28 and carries a ratchet 30 adapted to be engaged by a dog 31 carried by a lever-arm 32, which is loosely connected at its upper end to the shaft 25 and extends down through the slot 32ª in the plate 2, and at its lower end pivotally connected, as at 33, to a link 34 attached to a rock-shaft 35. The latter is journaled in the rearwardly-extending arms of the Y-shaped hangers 16 and 19. Adjustably mounted upon the shaft 25 is a pair of circular disks 36, 37, each provided with a collar 38 through which extends a set-screw 39 for adjustably connecting the disks to the shaft 25. Secured to the outer face of the disk 37 is a plurality of radially-extending curved holding arms 40 substantially U-shaped in cross section and carrying at the outer end friction rollers 41. The holding arms 40 near their lower ends are provided on their side faces with shoulders 42 constituting a means to indicate to the operator that the bag has been set in proper position when the bag is mounted upon the holding member. The holding arms 40 are pivoted, as at 43, to the angle plates 44, these plates 44 being secured by suitable holdfast devices to the outer face of the disks 37, thereby connecting the holding arms 40 with the disks 37. Projecting laterally from the lower portion of each of the arms 40 and forming a part of each of the arms 40 is a cuff 45 through which extends a gripper 46. The gripper 46 is substantially U-shaped in cross-section and is pivoted, as at 47, to the cuff 45; and the said gripper 46 is positioned in parallelism with respect to the lower portion of its respective holding arm 40 and is of such length as not to project below the inner end of its respective holding arm 40. The function of pivoting the arm 40 is to enable the proper tension to be placed upon the bag when the thread is to be inserted therethrough, means being provided to rock the arm 40 upon its pivot. This means will be hereinafter referred to, and, as before stated, it is termed the tension device for the bag. The function of the grippers 46 is to retain the bags upon the holding member during the stringing operation, and to furthermore act as a guide for the strippers. This will be more fully explained hereinafter. Secured to the outer face of the disk 36 is a plurality of radially-extending curved holding arms 48 which are substantially U-shaped in cross-section and carry on their outer ends, the friction rollers 49. There is an arm 48 positioned in parallelism with an arm 40, and upon each pair of parallel arms a bag is placed, as indicated in Figs. 5. The bag is indicated by the reference character 50. Each of the arms 48 is fixed at its lower end by suitable holdfast devices to the disks 36, and projecting laterally from the arm 48, as well as forming an integral part thereof at its lower end, is a cuff 51 in which is pivotally connected, as at 52, a gripper 53 which is substantially U-shaped in cross-section. It will be obvious, however, that the construction and arrangement of the holding arms 48 and grippers 53 may be the same as the holding arms 40 and the grippers 46. The fixing of the arms 48 at their lower ends is had owing to the fact that but one bag-tensioning device is employed, and this device is adapted to engage the arms 40 so that tension can be applied to the bag; but a pair of bag-tensioning devices can be employed; if employed, the arms 48 and grippers 53 would be of the same construction as the arms 40 and grippers 46. The arms 48 are provided with shoulders for the same purpose as the shoulders 42. A releasing means is provided for the grippers 46 and 53, and said means consists of a pair of arms 54 having beveled ends; and the function of said arms is to engage the lower end of the grippers 46, 53 when the grippers extend upwardly, as shown in Fig. 5, so that the bag can be readily mounted upon a pair of holding arms by the operator. When the bag is mounted upon a pair of holding arms, it is slipped down over them until the edge thereof contacts with the shoulders 42. As the shoulders 42 set off from the arms 40, 48, it is evident that the operator can readily feel when the bag has been positioned properly. The grippers 46, 53 come into play to hold the bag, and act as a means to guide the strippers, to be hereinafter referred to, when the pair of arms upon the bag is mounted to depend downwardly, as shown in Fig. 5. When the holding arms upon which the bag is mounted are at the position shown in Fig. 5, the supporting means for the two pairs of thread-guides act upon the grippers so as to move them to the position shown. The function of the rollers 41, 49 is to facilitate the turning of the bag rightside-out, and to assist in the ready removal of the bag from the arms by the strippers.

*Tensioning device for the bag-holding member;* Figs. 2, 3, and 4: The function of this device is to stretch the bag at the mouth-end thereof so that the necessary tension will be applied to the bag to prevent the slipping outwardly of the needles during the reciprocation thereof when inserting the thread through the end of the bag to form the strings. This device is adapted to engage the pivoted holding arms 40 of the holding member, shift the said arms outwardly on their pivots, thereby stretching the bag properly at its mouth-end and retaining the bag under tension until the two strings have been formed. The said device consists of a shiftable curved arm 55 extending transversely of the machine, arranged above the plate 2 and projecting towards the arms 40. The curved arm 55 is of such length that when it is shifted, it will engage one of the arms 40 and move the said arm upon its pivot, thereby stretching the bag. The arm 55 at its outer end straddles the plate 2, as at 56, and is pivotally connected to the said plate 2, as at 57. The arm 55 then depends downwardly, as at 58, and is provided on one face near its lower end with a cam-piece 59 which lies in the path of a shifting means for the arm 55, to be hereinafter referred to, said means being so constructed that the arm 55 will be shifted towards one of the arms 40 to stretch the bag, and after the strings have been formed, said arm 55 is shifted in an opposite direction, thereby releasing the arm 40 so the bag can be readily removed.

*The needle guides;* Figs. 4, 9, 10 and 11: The function of the needle guides is to guide the needles to each side of the bag. Two pairs of needle guides are employed. The function of each pair of needle guides is the same. That is to say, each pair of needle guides is adapted to guide a needle to each side of the bag so that the needle will insert the thread in such a manner in the bag as to form a loop. Each pair of the needle guides associates with the pair of holding arms that position the bag to receive the thread. The pairs of needle guides associates with a pair of holding arms when said pair of arms assumes the depending position shown in Fig. 5. As the construction and arrangement of each pair of needle guides are the same but one pair of needle guides will be described, the same reference characters being applied to both pair. One pair of needle guides opposes the other pair of needle guides, and the pairs of needle guides are arranged at opposite sides of the transversely-extending opening 3. Each pair of needle guides consists of a shiftable support 60 having one end bent at an angle, as at 61, which rests upon the plate 2. At a point removed from the angularly-turned end 61 of the support 60, a notch 62 is provided to permit of the entrance of a gripper 46 or 53, as the case may be, as shown in Fig. 11; and the said grippers when in such position, assist, as will be evident, in guiding the needles. Mounted upon the support 60 at each side of the notch 62 are the blocks 63, 64, each having a recess 65, the recess 65 of the block 63 opposing the recess 65 of the block 64. Shiftably mounted in each of the recesses 65 is a guide-block 66 having its outer end provided with a guide channel 67 which at one end is somewhat flaring. Each of the guide-blocks 66 terminates into a shank 68 playing into a socket 69 formed in its respective block, and attached to the shank 68 is a stem 70 which extends through its respective block and is connected thereto by a nut 71. Mounted in the socket 70 is a coiled spring 72 bearing at one end against the shank 68 and at its other end against the wall of the socket 69. When the pair of needle guides is in operative position, one of the grippers 52 or 46, as the case may be, extends between the guide-blocks 66 and forms what may be termed a wall for the guide channels 67. The blocks 63, 64 are secured to the support 60 by the holdfast devices 73. As will be evident by reference to Fig. 9, the blocks 63, 64 are arranged at one end of the support 60, but are positioned slightly removed from the notch 62. To the other end of the support 60 is secured by the holdfast devices 74 a pair of slidable retaining arms 75 which extend longitudinally of the upper face of the plate 2 and are retained upon the plate 2 by the keepers 76. Connected to the support 60 at a point intermediate the points of connection between the arms 75 is a depending fork 77 secured in position by the holdfast devices 78, and which is adapted to be engaged by the shifting mechanism, to be hereinafter referred to so as to shift the pair of needle guides longitudinally of the machine when occasion requires. The needle-guides are shifted so as to permit of the rotating of the bag-holding member, and also to permit of the support 60 straddling the grippers, and furthermore to allow said support to bear against the grippers so as to move the grippers on their pivots and bite the bag. The support 60 and the pair of grippers also acts as a means to prevent movement being imparted to the bag-holding member during the operation of inserting the thread. This is evident as the notch 62 surrounding the gripper will prevent any sidewise movement of the bag-holding member. The pair of needle-guides is shifted through the medium of a sector-shaped arm 79 having a portion of its length angularly disposed with respect to the remaining portion, as at 80, forming an incline terminating at each end in a straight portion. The fork 77 is adapted to straddle the sector-shaped arm 79 and is adapted to be engaged by the incline so that said fork 77 will be shifted in one direction or the other according to the direction of movement of the arm 79; and it will be evident that when the fork 77 is shifted, it will carry the support 60 therewith and move the elements connected to said support towards or from the opening 3, as the case may be. The sector-shaped arm 79 has one end free and its other end terminating in the outer end of a lever 81 which is fixed intermediate its ends upon the shaft 35, and has its other end connected by a vertically-movable link 82 (Fig. 4) with the bag-turner, to be hereinafter referred to. The lever 81 not only constitutes a means, when the link 82 is operated, to impart an oscillatory movement to the sector-shaped arm 79, but also acts as a means of shifting the bag-tensioning device formed by the curved arm 55. The outer end of the lever 81 when it rocks in one direction, is adapted to engage the cam-piece 59 on the depending end of the curved arm 55, thereby shifting said curved arm in one direction; and on the opposite movement of said lever 81 it is adapted to engage said cam 59 so as to shift the arm 55 to its normal position.

*The reciprocatory and transversely-shiftable needles;* Figs. 32, 33 and 34: Two needles are employed, owing to the fact that two strings are inserted; the needles reciprocate in an opposite direction with respect to each other, but both operate upon the bag at the same time. While one needle is passing through one side of the bag, the other needle is passing through the opposite side. Both needles eventually operate upon both sides of the bag but in opposite directions, such operation being an alternate one. As the construction of both needles is the same, but one needle will be described, the same reference characters being applied to both. Of course it will be evident that the shank of the needle is of the desired length, and is indicated by the reference character 83. The point of the needle is indicated by the reference character 84, and is what may be termed "spear shape"; an eye is provided, as at 85, and upon one side of the point of the needle, a cut-away portion 86 is provided, forming thereby a shoulder 87 slightly removed from the eye 84. The needle on its top side is provided with a groove 84ᵃ. A groove 88 is formed on that side of the point which is cut away, and the said groove extends in longitudinal alinement with respect to the eye. One side of the needle is provided with a groove 89, which extends from the cut-away portion 86 along the shank, and the other side of the needle is provided with a groove 90 which extends from a point near the extreme end of the needle and continues along the shank. The grooves 89 and 90 receive the thread during the travel of the needles through the bag end. When the needles are set up for operation, they are so secured in position as to have the cut-away portion 86 extend at a slight inclination, as this has been found to obtain a more satisfactory working.

*The reciprocatory combined thread-guide and thread and needle holders;* Figs. 2, 12, 13, 20 and 36: Two combined thread-guide and thread and needle holders are employed. Both constructions are the same, so only one will be described, the same reference characters being applied to both. The function of the combined thread-guide and thread and needle holder is to guide the thread and bite and hold the thread when occasion requires, and to hold the needle during the reciprocations thereof. The combined thread-guide and thread and needle holder consists of a reciprocatory plate 91 operating in a way 92 formed between the longitudinally-extending bars 93, 94 of a transversely-shiftable support. The bars 93, 94 are connected to depending end members 95, and these end members, in connection with the bars 93, 94, form the transversely-shiftable support. The end members 95 project up through the openings 5 and 7 of the plate 2, so that said support can be shifted transversely of the plate 2 in a manner as herein set forth. When said support is shifted, the plate 91 is carried therewith. The plate 91 is provided with flanges 96 resting upon the bars 93, 94 and said plate is furthermore provided with a groove to receive the shank 83 of the needle. Superposed upon the plate 91 is a clamping piece 97 and upon said clamping piece 97 is mounted a plate 98 having at one end an upwardly-extending pair of apertured ears 99, through which the thread extends, the openings in the ears acting as thread-guides. On the other end of the plate 98 a pair of apertured ears 100 is provided and to which is pivoted, as at 101, a spring-pressed clamping arm 102, which when occasion so requires, is adapted to have its free end clamp or bite the threads between the two ears 99. The pivoted end of the arm 102 has a vertically-extending yoke-shaped projection 103 to which is pivoted a swinging piece 104, whose function is to move the arm 102 to position to bite the thread. Normally the arm 102 has its free end elevated owing to the action of the spring. An arm 105 is adjustably connected to the plate 2, as at 106, and is provided at its upper end with an angular extension 107 projecting in the path of the swinging piece 104 so that when occasion requires, the said extension 107 will engage the swinging piece and rock the arm 102 on its pivot and cause said arm 102 to bite the thread. A stud 108 is fixed to the bar 94 and is in the path of the swinging piece 104 so that when occasion requires, said stud, will engage the swinging piece and release the thread. The thread is held taut by the arm 102 when being cut and the arm 102 is released after the thread is cut, so that the thread can be fed to the bag. The plates 97, 98 are detachably secured to the plate 91 by the holdfast device 109.

*The reciprocating and shifting means for the needles;* Figs. 1, 15 to 20, both inclusive: The function of said means is to reciprocate the needle so as to insert the thread through the bag, and for shifting the needle so that after a needle has passed through one needle-guide, it will be caused to pass through the other. That is to say, a means for shifting each needle transversely is provided so that during the reciprocation of the needles, they will alternately pass through a needle guide of each pair of guides. Said means consists of a crank arm 110, fixed at one end to a shaft 111 and connected at its other end by a curved link 112 to the plate 91. The crank-arm 110 is pivotally connected to the link 112. The shaft 111 is operated by a gear 113 meshing with a gear 114. The gears 113, 114 are supported in brackets 115 depending from a cross-bar 116 which connects the lower end of the end member 95 with the end member 96. The end member 96 is supported at its lower end upon one of the drive shafts 14 or 15, and depending from the bracket 115 is a support 117 which is mounted upon one of the drive shafts 14 or 15. The lower end of the end members 96 and the lower ends of the supports 117 form bearings for the drive shafts 14 and 15, as will be evident. The gear 114 is held from movement by a locking pawl 118 which is pivoted to the end member 95 and is adapted to engage between the offsets 119 arranged below that portion of the gear 114 with which the gear 113 meshes. The manner in which the pawl 118 is released and the means for operating the gear 114, will be hereinafter referred to. The shifting transversely of the needle is had through the medium of a rod 120 (Fig. 3), which is adjustably connected, as at 121, to a bar 122 carried by the support 117 and connected with the bracket 115. The rod 120 is attached to an eccentric 123 carried by a rock-shaft 124, the latter being journaled in the forwardly-extending portions of the Y-shaped hangers 16 and 19 and in the machine frame. The rock-shaft 124 is actuated so as to shift the support for the needle transversely through the medium of a depending arm 125 carried thereby and which is provided with a roller 126 adapted to be engaged and operated by a combined cam and gear-wheel, to be hereinafter referred to.

*The looper;* Figs. 1 and 36: The function of the looper is to catch the thread after the needle has inserted the thread through one side of the bag and is about to insert the thread through the other side of the bag. This as will be evident, will form a loop. The looping of the thread is not only obtained by the looper but the said looper also acts as a means to tension the thread, and furthermore holds the loop during the knotting operation and still retains the loop until the bag is removed from the holding arms by the strippers. In Fig. 36 the function of the looper is clearly shown, and said figure furthermore shows the needle about to enter a second time into the knotting mechanism. Two loopers are employed, but as the construction of both the loopers is the same, but one will be described, the same reference characters being applied to both. Each of the loopers consists of an inverted V-shaped arm 127 pivoted at its upper end, as at 128, to a support 129 carried near one end of a longitudinally-extending bar 130, the latter being fixed at one end to one of the hanger brackets 27, and at its other end connected by a curved bar 131 to the plate 2. The inverted Y-shaped arm 127 is provided with a lug 127ᵃ which acts as a stop to limit the movement of the arm 127 towards the bar 130. The bar 130 is arranged above the plate 91 so as to properly position the arm 127 at one side of the needle when the needle reciprocates to enter one side of the bag, and when the needle is shifted to enter the other side of the bag, the arm 130 will be positioned on the opposite side of the needle so that when the needle travels to enter the bag, the thread will be caught by a hook member, to be hereinafter referred to. Pivoted to the bar 130 near its outer end is a depending lever arm 132 which is connected to the arm 127 by a coupling member 132ᵃ, the latter being suitably attached, as at 133, to the arm 127 and as at 134, to the upper end of the arm 132. The pivot of the lever arm 132 is indicated by the reference character 135, and the said lever-arm 132 carries upon its lower end a pivoted trip member 136 which is connected to the bar 130 by the pulling spring 137. The hooked member is indicated by the reference character 138 which is loosely mounted in the diverging lower end of the arm 127 and is of such length as to extend from each side of the lower end of said arm 127. Mounted upon the member 138 and interposed between the diverging ends of the arm 127 is a compression spring 139. The spring 139 when the member 138 is pulled towards the center of the machine compresses. The hooked end of the member 138 is indicated by the reference character 140. The spring 137 tends to cause the looping mechanism to assume the position shown in Fig. 1, and from the arrangement of the springs 137, 139, it is evident that the pull of the thread will be against the pull of the spring 137, as well as against the pull of the spring 139; consequently a yielding pull is had, and in view of the location of the spring 137, 139, it will be evident that when the thread passes off the member 138, that said member 138 will be caused to assume its normal position, and the said arms 127 and 132 will assume the position shown in Fig. 1 unless an abutment is interposed to arrest the movement of the arm 127 towards the bar 130. The abutment for arresting the movement of the arm 127 is indicated by the reference character 141, and the said abutment is provided with a yielding upper end, as at 142 (Fig. 20). The abutment 141 is in the form of an inverted L-shaped bar, and is secured upon the inner end of the bar 94. The abutment 141 is shifted with the support for the combined thread-guide and thread and needle-holder, and when shifted is positioned in the path of the arm 127. The abutment 141 is positioned in the path of the arm 127 when the needle is first inserted in the bag, and when the support for the thread-guide and thread and needle-holder is again shifted, the abutment 141 is moved out of the path of the arm 127, but at this time the thread has been taken up by the hook member 138, and the pull of the thread prevents the arm 127 moving back towards the bar 130. The movement of the arm 127 towards the center of the machine is also assisted by a lug 143 (Fig. 36) secured to the plate 91, in a manner as hereinafter referred to. The lug 143 also acts as a means to actuate the trip 136 when the plate 91 moves away from the center of the machine. The yielding upper end of the abutment 141 assists, when occasion requires, the arm 127 to move should it fail to move from the center of the machine, where it catches the thread which makes the loop. The yielding upper end 142 of the abutment 141 is beveled so that the movement just referred to can be had. The yielding upper end 142 of the abutment 141 consists of a short bar extending through the upper end of the vertical portion of the abutment and carries a compression spring 144. The short bar is headed as at 145 and beveled as at 146ᵃ; see Fig. 14.

*The knotter;* Figs. 3, 4, 5, 21 to 30 and 35 to 44: The function of the knotter is to catch the thread after it has been inserted through both sides of the bag, then knot the thread and then cut the thread so that the completed string will slip away from the knotter to enable the bag with the pair of strings to be stripped from the holding arms. Two knotters are employed, but as the construction of both knotters is the same but one will be described, the same reference characters being applied to both. There is a knotter positioned in suitable relation with respect to each pair of needle-guides, and the knotter upon one side of the machine associates with the needle upon the opposite side of the machine; and the position of the knotter is such that when the needle passes through the thread-guide of each pair of thread-guides, it will also enter an element of the knotter, said element catching the thread and holding it while the needle withdraws. After the needle is withdrawn and is shifted so as to pass through the other guide of each pair of needle guides, the knotter will also be shifted so as to again receive the needle and catch and hold the thread while the needle withdraws. After the needle withdraws a second time, the thread is cut by a suitable device, to be hereinafter referred to, and the operation of the knotter then takes place, the operation being such as to form a knot in the thread, and after the knot is formed, cuts the thread so as to complete the string. The knotters are adapted to extend up through the openings 4 in the plate 2; best shown in Fig. 5. Each of the knotters consists of a supporting frame formed of a transversely-extending lower member 146 having a centrally-arranged opening 147 to permit of mounting the supporting frame upon the drive shaft 14 or 15 as the case may be. The opening 147 is formed by providing centrally of the member 146 what may be termed an integral collar 148. The member 146 is flat and of suitable width, and extending upwardly from each end thereof is a flat side member indicated by the reference characters 149, 150. The side members 149 and 150 terminate at their upper ends in a flat top member 151 which is also provided centrally thereof with an integral collar 152 forming an opening 153. The collar 152 extends in a longitudinal direction, whereas the collar 148 extends in a vertical direction. Formed integral with the side members 149, 150 at a point below the member 151, is an intermediate member 154 of the same construction as the member 151. Secured to the side member 150 by the holdfast devices 155, is a shifting rod 156 which is adjustably connected, as at 157, to the rod 158 carried by the eccentric 159 mounted upon the rock-shaft 124; see Fig. 4. The function of the rods 156, 158 and eccentric 159, is to shift the supporting frame of the knotter so that the elements carried thereby will be shifted when occasion so requires so that the knotter will be moved in the path of the needle to take up the thread. Extending through the member 151 and member 154 and projecting above said member 151, is a vertically-movable and rotatable cylinder 160, the upper portion 161 and the lower portion 162 thereof being of greater diameter than the intermediate portion, forming thereby the shoulders 163, 164. The diameter of the lower portion 162 of the cylinder 160 is such as to snugly but movably fit the openings formed in the members 151 and 154. The cylinder 160 at one side of the portion 161 is provided with an opening which extends entirely therethrough and which terminates in a groove formed in the periphery of the intermediate portion of the cylinder, and the said groove at its lower end terminates in an opening which extends entirely through the lower portion 162 from the cylinder 160. Extending through the said openings and the groove formed in the cylinder, is a vertically-movable and rotatable support for a combined thread-catching and winding element. The said vertically-movable and rotatable support is in the form of an elongated rod 165 shouldered, as at 165$^a$ and 165$^b$. This shouldered portion of the rod 165 receives an elevating and lowering means for said rod 165 and said cylinder 160. Said elevating and lowering means will be hereinafter referred to. The combined thread-catching and winding element carried by the rod 165 is formed of an angularly-extending slightly-curved arm 166 which terminates at one end in one side of the top of said rod 165, and has its free end provided with a laterally-extending L-shaped stop 167 which is positioned at the top of said free end. The latter is further provided at its bottom and in parallelism with the stop 167 with a laterally-extending needle-guide 168 which is formed with an upper and a lower thread seat 172, 172$^a$, respectively, for the threads to enter. These surfaces are formed by cutting away the upper surface of the guide 168, forming thereby a shoulder 172$^b$. The upper seat 172$^a$ is for the first entrance of the thread into the knotter and the lower thread seat 172 is for the second entrance of the needle into the knotter. The first entrance of the needle in the knotter is to cause the thread-catching and winding element to catch the first end of the thread, and the second entrance of the needle into the thread-catching and winding element is to cause what may be termed the catching of the second thread. This operation will be more fully referred to hereinafter. Pivoted to one side of the arm 166, as at 169, is a thread-catcher having its forward end, or rather that end which is arranged between the stop 167 and the guide 168, formed in its lower edge with an inclined wedge-shaped notch 171 which is adapted to receive the thread and hold it, for the reason that the thread pulls away from the catcher, and the shape of the notch 171 causes the wedging of the thread so that the thread cannot be released from the catcher unless the thread is pulled in an opposite direction or away from the center of the machine. The stop 167 overlaps the notched end of the thread-catcher so as to prevent the shifting laterally of the said notched end, and the said stop 167 also limits the upward movement of the notched end of the thread-catcher 170 while the duplex needle guide 168 limits the downward movement of the said notched end of the thread-catcher 170. The lower end of the rod 165 carries a worm wheel 173 which is adapted to mesh with the toothed rack 174 forming a part of the rotatable means for the combined thread-catching and winding element, said rotatable means being in the form of a vertically-movable bar 175. The manner in which said element 175 is vertically moved will be hereinafter referred to.

Extending centrally through the cylinder 160 is a vertically-movable combined carrying and looper element 176 in the form of a tubular rod suitably cut away to receive the bar 175 and a knot-drawing bar 177. The said rod 176 is further cut away to permit of the operation of the knot-drawing bar and the knife for cutting the thread to complete the string. The said rod 176 is cut away, as at 178 to receive the rack portion 174 of the bar 175; is provided with grooves 179, 180 to form a guide and to receive the bar 175; is further provided with a guide channel 181 which terminates at its top in ing and lowering of the lifting member so that the thread will be presented to the edge of the cutting blade and severed. The lifting element is operated through the medium of an inverted V-shaped trip member, the arms of which are indicated by the reference characters 241 and 242. The inverted V-shaped trip member is pivoted at its upper end to the carrier 243 which is positioned at one side of the shifting support for the needles and is carried by the reciprocatory plate 91. The carrier 243 is secured to the plate 91 by the holdfast device 244 which also acts as a means for securing the element 143 to said plate 91, the element 143 being mounted upon the inturned end of the carrier 243. The inverted V-shaped trip member when positioned over the lifting element so that the arms of said trip member will engage the lug 239 and shoulder 240 will cause the elevating and lowering of the lifting element. The carrier 243 is shifted transversely of the machine with the plate 91. When the plate 91 is shifted so that the needle will be in a position to make its first insertion of the thread in the bag, the trip member will be shifted from over the lifting element; but when the plate 91 is shifted so that the needle will be in a position to make its second insertion of the thread in the bag, the inverted V-shaped member will be arranged over the lifting element and the lug 239 will be in the path of the trip member as the carrier 243 moves forward and on the return of the carrier 243, the shoulder 240 will be in the path of the member 242. As the plate 91 moves forward, carrying the element 243 therewith, the arm 241 will ride up the inclined face of the lug 239 and will have no action at all upon the lifting element, but as the carrier 243 moves back with the plate 91, the end of the arm 241 will engage the crotch formed by the junction of the inclined lug 239 with the longitudinally-extending portion 235 and cause the lifting element to lower so that the hook 233 will be in a position to grasp the thread when the lifting element is elevated. As the carrier moves backwardly, the action of the end of the arm 241 at the crotch formed at the junction of the lug 239 of the longitudinally-extending portion 235 will tend to swing the trip member on its pivot and move the arm 242 into engagement with the shoulder 240 which will cause an elevation of the lifting member, carrying the thread therewith and presenting the thread to the cutting blade, causing thereby the severing of the thread.

*The strippers;* Figs. 1, 4, 5 and 46: The function of the strippers is to remove the bag from the holding arms after the two strings have been completed. The strippers work in conjunction with the combined bag-turner and stretcher, which will be hereinafter referred to. The strippers consist of a pair of vertically-extending arms 244 and 245 having their upper or free ends formed in a hook-like manner, as at 246, and their lower ends bent inwardly, as at 247 and fixed to pivoted coupling pieces 248 which are each provided on one face with an outwardly-projecting pin 249. The arms 244, 245 are positioned approximately centrally of the machine below the bag-holding member and their operation is such that they are moved vertically to a position between a gripper and a holding arm, as shown in Fig. 5, and then swung inwardly so that the end thereof will engage over the top edge of the bag to enable the arms 244, 245 when lowered to strip the bag off of the holding arms. The arms 244, 245 are swung towards each other after they are inserted up to a position between a gripper and a holding arm. If swung towards each other before their entrance into the grippers and holding arms, it would be evident that their vertical movement would be impeded by the bag and that the hooked end 246 would be liable to engage the bag and damage it. The arms 244, 245 are vertically moved and swung towards and away from each other by the vertical movement and actuation of the coupling pieces 248. The elements for carrying out such operation will now be described: The coupling pieces 248 are pivoted to a vertically-movable carriage 250, openings 251 being provided in the carriage 250 through which extend the pivots 252 of the coupling pieces. The coupling pieces are arranged against the rear face of the carriage 250 and the pins 249 of the coupling pieces 248 are adapted to extend through oval-shaped slots 253 formed in the carriage 250 at a point below the openings 251. The carriage 250 at its top and bottom is provided with angularly-extending ends 254 and 255, each of which is provided with a pair of rectangular-shaped openings 256 and a pair of circular openings 257. The circular openings 257 permit of the mounting of the carriage upon a pair of guide-rods 258 which are suspended from the plate 2, one at each side of the opening 3, the said rods 258 being secured to the plate 2, as at 259 and are connected at their lower ends to the Y-shaped hangers 16, 19 by the cross piece 260. The rods 258 near the lower ends thereof are provided with shifting collars 261 and near the upper end thereof are provided with shifting collars 262. The carriage 250 is vertically moved through the medium of an actuating rod 263 which is connected at its lower end in one end of a sectional rocking lever 264 and at its upper end is bifurcated, as at 265 so as to straddle a cross-piece 266 forming a part of the carriage 250. The bifurcated end 265 of the actuating rod 263 is pivotally connected to the cross-piece 266. Extending through the opening 256 of the carrier is a pair of actuating members 267, each of which, near its lower end, is provided with an angularly-shaped slot 268, and through the slots 268 extends the pins 249. The inner face of each of the actuating members is provided with a flat spring 269 so as to cause a frictional engagement between the actuating member and the front face of the carriage 250. The collars 262 are positioned in the path of the upper end of the actuating members 267 and the collars 261 are positioned in the path of the lower end of the actuating members 267. By such an arrangement when the carriage 250 moves upwardly, the members 267 abut against the collars 262; consequently the said members 267 are lowered, and owing to the action of the walls of the slots 268 against the pins 249, the arms 244, 245 will be caused to swing at their upper ends towards each other. When the carriage 250 moves downwardly, the arms 267 engage the collars 261, and the action of the walls of the slots 268 against the pins 249 will cause the lower ends of the arms 244, 245 to swing inwardly and the upper ends outwardly. The swinging inwardly of the upper ends of the arms 244, 245 is not had until the hooked ends 246 of the said arms are in a position to be moved over the top edge of the bag 50, as shown in Fig. 5.

*The bag-turning and stretching mechanism;* Figs. 1, 3, 4, 46, 48, 49 and 50: This mechanism, as before stated, operates in connection with the bag-strippers, and the function thereof is to cause the turning of the bag right side out during the stripping of the bag from the holding arm; and furthermore, to cause the stretching of the mouth of the bag, as clearly shown in Fig. 49. After the bag has been turned right side out and stretched, it is swept from the machine in a manner as hereinafter set forth. The bag-turning and stretching mechanism consists of a bag-turning arm 270 which is hinged at its inner end, as at 271, to a vertically-movable member 272 curved at its upper end, as at 273, so as to position the hinged end of the arm 270 approximately centrally of the machine and in line with the bottom of the bag when the latter is moved to a position to receive the strings. The bag-turning arm 270 normally lies in a horizontal position and is shifted from said position to a vertical position so that the said arm 270 can be vertically moved to engage the bottom of the bag, forcing the same upward between the holding arms, and in connection with the strippers hereinbefore referred to, turning the bag so the right side thereof will be out. The arm 270 is pivotally connected, as at 274, to the upper end of a pair of curved links 275, the latter having their lower ends connected to a sliding plate 276 loosely mounted upon the member 272. To the sliding plate 276, the lower ends of the links 82 are connected. To the lower end of the vertically-movable member 272 is fixed a plate 277 having pivotally connected to one end thereof, as at 278, an upwardly-extending inclined curved arm 279, the latter having its upper end pivotally connected, as at 280, between the sections of that end of the rocking lever 264 opposite to the end between which the lower end of the actuating rod 263 is connected. The bag-turning arm at its free end has its upper and lower face provided with an offset 281 with the edge thereof inclined inwardly, and the said offsets are arranged approximately centrally of the faces of the arm 270 so that the free end of the arm in section or at its outer edge would be substantially in the shape of a cross. By such an arrangement, the end of the arm 270 is of such size as to not slip past the bottom of the bag during the vertical movement of the arm to turn in connection with the strippers the bag right side out, as indicated in Fig. 46. During the turning of the bag right side out, the rollers 41, 49 carried by the holding arms will facilitate the turning of the bag, as will be evident. When the levers 81 are shifted by the rock-shaft 35 so that the inner arm of the levers will be elevated, the links 82 are carried therewith, which in turn will carry the sliding plate 276, the latter elevating the links 275, which in turn will carry the arm 270 and the vertically-movable member therewith. During this elevating movement of the parts, the arm 270 will be caused to swing from a horizontal to a vertical position owing to the manner in which the links 272 are connected to the arm. When the arm 270 is moved to a vertical position, it will be below the bottom of the bag, and as the arm moves upwardly, it will engage the bottom of the bag and turn the bag right side out so that the bag will inclose the arm 270, as shown in Fig. 48; and as the parts lower, owing to the actuation of the levers 81 in an opposite direction, the stretching devices will come into play so as to stretch the mouth-end of the bag, as indicated in Fig. 49. These stretching devices will be hereinafter referred to. After the bag has been stretched, the arm will lie in a horizontal position, as shown in Fig. 4, and the sweep will come into play and remove the bag from the arm. When the member 272 moves downwardly, it will shift the arm 279 so as to rock the lever 264 and elevate the actuating rod 263, thereby moving the stripping arms 244, 245 to operative position; and when the vertically-movable member 272 is elevated, the lever 264 will be caused to rock in an opposite direction; consequently carrying the rod 263 downwardly and moving the stripping arms 244, 245 to inoperative position. The stretching device for the bag consists of a pair of swinging hook members 282 which are pivoted, as at 283, to the lower face of the arm 270, and are connected together by an extensible and contractible spring 284, the inward movement of the members 282 being limited by a stud 285 carried on the lower face of the arm 270, and the said members 282 have their pivot slightly removed from the free end of the arm 270, while the hooked ends of the members 282 extend towards the hinged end of the arm 270. The members 282 are swung outwardly by riding against the inclined portion 286 of a pair of deflecting bars 287 which are adapted to be secured to the plate 2, one at each side of the opening 3 and depend downwardly and are provided with angularly-disposed ends 288 to prevent the members 282 from riding off the bars 287 at the lower end thereof. From such construction, it is evident that when the arm 270 is in an upright position, as shown in Fig. 48, the hooks will be in their normal position; but as the arm 270 swings from vertical to horizontal position, the hooked ends of the members 282 will ride against the inclined portion 286 of the bars 287, and consequently said members will be caused to assume the position shown in Fig. 49, thereby stretching the mouth-end of the bag and the bag will then be in a position as shown in Fig. 49, with the corners tucked in and the mouth stretched.

*The sweep;* Figs. 1 and 4: The function of the sweep is to remove a bag from the bag-turning arm 270. Any suitable form of device for such purpose can be employed. By way of example, the sweep shown herein consists of a disk 289 having a series of radially-extending curved sweeper arms 290. The disk 289 is mounted upon a shaft 291 rotatably mounted in the machine frame at such point that the sweep will lie below the arm 270 when it is moved to horizontal position, the distance of the shaft 291 from the arm 270 being such that as the shaft operates and rotates the disk 289, the arms 290 will engage the bag to sweep it from the arm. The shaft 291 is operated through the medium of the belt 293 which travels over the sprocket wheel 292 carried by the transmission shaft 24.

*The combined cam and gear wheels;* Figs. 1, 3, 4, 15 and 18: Two of these wheels are employed, one of which is mounted upon the drive shaft 14 and the other of which is mounted upon the drive shaft 15. These wheels are constructed so that the cam tracks and toothed portions of one wheel will be oppositely disposed with respect to the cam tracks and toothed portions of the other wheel so that the simultaneous operation of the various duplex mechanisms will be had, but the direction of movement of one of the mechanisms of the duplex mechanism will be in an opposite direction with respect to the other mechanism. The positions of the cam tracks and toothed portions of the combined cam and gear wheels are such that those mechanisms which are operated by the combined cam and gear wheels will be operated in a successive manner and at the proper time. The combined cam and gear wheels cause the operation of the reciprocatory means for the needles, operate means for transversely shifting the needles, operate certain elements of the knotters, operate the shifting means for the knotters and the rock-shaft 35 in both directions so as to actuate the levers 81 in both directions, causing thereby the operation of the bag-strippers and the bag-turning and stretching device, and furthermore the shifting longitudinally of the needle guides, as well as the moving to and from operative position of the bag-tensioning device. Each of the combined cam and gear wheels has its outer face provided with a cam-track 294 over which travels the roller 229 for causing a vertical movement of the element 226, thereby moving upwardly and downwardly the coupling member 190. On the same face of each of the combined cam and gear wheels, a cam-track formed by the members 295, 296 is provided, and against which travels the roller 213 for elevating and lowering the yoke 208. On the outer face of each of the combined cam and gear wheels, the cam-track 297 is provided against which travels the roller 126 carried by the rod 125 to cause the rocking of the shaft 124 which in turn will cause the transverse shifting of the needle, as well as the transverse shifting of the knotters. A beveled toothed portion 298 is provided on each of the said wheels which is adapted to engage and operate the bevel gear 214 of the knotter, and one end thereof is adapted to shift the cam piece 215 to permit of the operation of the gear 214 by the toothed portion 298. The length of the toothed portion 298 is such that only one complete revolution of the cylinder 160 will be had with each engagement of the gear wheel 214 by the toothed portion 298. Each of the combined cam and gear wheels is further provided with a beveled toothed portion 300 having a gap 301. The teeth of the portion 300 extend in an opposite direction with respect to the direction in which the teeth of the portion 298 extend. The toothed portion 300 is adapted to engage the beveled toothed portion 302 of the gear wheel 114 so as to cause the operation of the reciprocating means for the needles. The gap 301 is formed to cause the discontinuance of the travel of the needles during the time that the needles are transversely shifted from a position in front of one needle-guide of each pair of needle guides to a position in front of the other needle guide of each pair of needle guides. The length of the toothed portion 300 is such that the needles will not be reciprocated during the operation of tying the knot. The pawl 118 is released from between the offsets 119 by the engagement of one end of the toothed portion 300 riding against the beveled portion 303 of said pawl; consequently as the toothed portion 300 moves forwardly, the riding thereof against the beveled portion 303 will cause the shifting of the pawl 118 out of engagement between the offsets 119 and allow of the toothed portion 300 rotating the gear 114. The periphery of each of the combined cam and gear wheels is provided with a toothed portion 304, and the said toothed portions 304 are adapted to engage and operate the quadrants 305 carried by the rock-shaft 35 and which will cause the rocking of the shaft 35 in both directions, thereby rocking the lever 81 which will cause the operation of the bag-turning and stretching mechanism, as well as the bag-stretchers, and will also cause the shifting of the bag-tensioning device as well as the shifting of the two pairs of needle guides.

Mounted upon the plate 2, at each end thereof, and at one side of each support for the needles, is a spindle 306 carrying the thread supply 307, the thread being shown, as at 308, as connected to the combined thread-guide and thread and needle-holder; see Fig. 2.

As the machine is particularly designed for use in stringing tobacco bags, these bags as now manufactured being in series connected together by short threads, as indicated by the reference character 309, Fig. 47, the bags are furnished with the inside out and are in such condition when placed upon the bag-stringing machine as to have the threads inserted to form the pair of strings in the mouth-end of the bag. A means is provided for severing the threads 309 so as to enable the operator to readily position a single bag, and said means consists of a knife 310 connected to one of the hanger brackets 26.

Briefly described, the operation of the machine is as follows: The bag being placed in position, upon the holding member, and said member rotated to position to move one of the bags to the position shown in Fig. 5, and the threads being inserted in the needles, the machine is then operated and the needles reciprocate and insert the thread through both sides of the bag at the top thereof so as to form a pair of loops in connection with the loopers. During this operation, the thread is caught by the knotters. After the threads have been caught by the knotters, they are severed by the thread-cutters and the knotters operated to draw the knot. During the operation of the knotters, the operation of the needles is discontinued. When the knot has been drawn, the strippers and bag-turning and stretching device comes into operation, turns the bag right side out and stretches the mouth of the bag; after which the bag is swept from the bag-turner. The operation of the bag-holding member is intermittent so that during the operation of the knotters, the bag-turning and stretching device and the strippers, the bag-holding member remains stationary. After the bag has been strung and removed from the bag-holding member, the latter then operates to move a bag to a position so as to receive the threads from the needles.

Before describing specifically the general operation of the various parts, the manner of drawing the knots by the knotters will be set forth, reference being had to Figs. 35 to 44, and as the operation of both needles is the same, as well as both knotters, the operation of but one needle and but one knotter will be referred to specifically, as a description of one applies to the other. The needle enters one side of the bag, as indicated at A, Fig. 35, passes through the said side of the bag and enters the combined thread-catcher and winding element so as to have the thread caught by the said element, as at B, the needle recedes and leaves the thread in one side of the bag; after the needle has receded back through the bag and to the position shown in Fig. 35, it is then shifted so as to pass through the other side of the bag, as indicated at C, Fig. 36. When the needle is shifted, the thread is taken up by the looper, as indicated at D, Fig. 36, forming thereby the loop E. The needle carries the thread through the bag and again enters the thread-catching and winding element. The thread is caught by said element and the needle recedes. As the needle leaves the said element, that portion of the thread which is interposed between the ends of the needle and the said element is caught by the hooked end of the lifting element of the thread cutter, as indicated at F, Fig. 38, and the said portion is severed. The said catching and winding element is then rotated away from the bag and which carries the loop therewith. The position to which the said element moves is that as indicated by the reference character G, Fig. 39. Intermediately after the said element passes over the top of the combined carrier and looper 176, the latter is elevated as well as the knot-drawing bar 177 to the position shown at H, Fig. 39; the cylinder 160 is then turned, causing thereby the looping of the thread around the carrier and looper, as indicated at I, Fig. 40. Prior to the looping of the thread around the carrier and looper, the thread-catching and winding element is lowered to the position shown at J, Fig. 40. After the loop has been formed in the thread, the thread-catching and winding element and the sleeve 203 are elevated to the position shown at M, N, Fig. 42, and the thread-catching and winding element is turned to position the thread under the hooked end of the knot-drawing bar. As the sleeve 203 is moved vertically, it strips the loop off the combined carrier and looper and simultaneously with such movement, the carrier and looper with the knot-drawing bar is moved downwardly; the knot-drawing bar then draws the knot during its downward movement, and the thread is drawn from the thread-catching and winding element, and the loop formed by the drawing of the knot severed as the thread is drawn downwardly over the cutter blade in the sleeve 203. Fig. 41 shows the loop prior to the drawing of the knot, as indicated by the reference character O, Fig. 43 shows the knot just about to be drawn, as indicated by the reference character P, and Fig. 44 shows the completed knot with the loop formed by drawing the knot, severed, as indicated by the reference characters R, S, T, respectively. The disconnected portion of the string, indicated by the reference character W is removed by the operator when filling the bag.

The specific operation of the machine is as follows: It will be assumed that the bag is in the position shown in Fig. 5, and before the stripper arms have been moved to the position shown in Fig. 5, the gears 10 and 11 being rotated, motion will be imparted to the drive shaft 14, which will be operated in the direction as indicated by the arrow, Fig. 1, and said drive shaft 14 will rotate the combined cam and gear wheel 12. Motion will also be transmitted to the drive shaft 15 through the medium of the transmission shaft 24 and gears 22, 23, the drive shaft 15 rotating in the direction as indicated by the arrow Fig. 1 and imparting a like movement to the combined cam and gear wheel 13. The position of both needles at this stage will be that as indicated in Fig. 2; the thread 308 has been inserted through the apertured ears 99 and through the eyes 85 of the needles. The combined cam and gear wheels 12, 13 being rotated, the toothed portions 300 of said wheels 12, 13 will be moved to a position to shift the pawls 118 out of engagement with the gears 114, and the said toothed portions 300 will engage the beveled teeth 302 of the gears 114 and rotate said gears 114 which in turn will rotate the gears 113. These latter will rotate the cranks 110 which in turn will carry the elements 112 therewith and reciprocate the plates 91, these latter carrying the needles forward, inserting the same through the sides of the bag, causing the needles to enter the combined thread-catching and winding elements so that the said elements will catch the threads; the toothed portions 300 still continue to rotate the gears 114 so as to cause the needles to withdraw. When the needles have been completely withdrawn, and at the end of their stroke in a rearward direction, the gaps 301 will at this time straddle the gear wheels 114, and consequently discontinue the operation thereof momentarily. When the needles are moved forward for their first insertion through the bag, they pass through a needle guide of each pair of needle guides, said pairs of needle guides having been shifted to a position, through the medium of the sector-shaped arm 79, to straddle a pair of grippers, the operation of the sector-shaped arm being had by the rocking of the levers 81 through the medium of the quadrants 305 being engaged by the toothed portions 304, thereby rocking the shaft 35, the position of the quadrants 305 being such and the position of the toothed portions 304 being so placed with respect to each other that one of said portions 304 will cause the rocking of the shaft 35 in one direction while the other quadrant will cause the rocking of the shaft 35 in the opposite direction, and such rocking of the shaft 35 to position the two pairs of needles guides is had in advance of the rotating of the gear wheels 114 by the toothed portions 300. This will be evident by reference to Fig. 15, where the disposition of the toothed portions 304 with relation to the toothed portions 300, is shown. When the needles have been returned to the limit of their rearward stroke, and the operation of the wheels 114 momentarily arrested owing to the fact that the gaps 301 are straddling said gear wheels 114 and during the time that the wheels 114 remain inoperative owing to the gaps 301, the cam-track 297 engages the rollers 126, shifting thereby the arms 125 which in turn will rock the shaft 124, and the rocking of the shaft 124 will shift the rods 120 and rods 156, causing thereby the transverse shifting of the supports for the reciprocatory plates 91 and the transverse shifting of the knotters, the shifting of one support being in the opposite direction with respect to the shifting of the other support; a like action being had in connection with the knotters. The shifting of the needles will position them so that they will pass through the other needle guide of each pair of needle guides, and the shifting of the knotters will position the thread-actuating and winding elements in the path of the needles so as to again catch the thread. After the parts have been positioned in a manner as stated, the toothed portions 300 are caused, owing to the operation of the cam and gear wheels 12, 13, to again engage and rotate the gears 114 which will reciprocate the needles towards the bag, insert the needles through the bag, and enter the thread-catching and winding elements of the knotters so that the said elements can again catch the thread; the needles then withdraw and are moved to the limit of their stroke in a rearward direction. The needles then remain at rest owing to the fact that the toothed portions 300 at this time pass clear of the gear wheels 114, and when the said toothed portions 300 pass clear of the gear wheels 114, the pawls 118 then automatically move back to engage between the offsets 119 so as to retain the gear wheels 114 stationary until the pawls 118 are again moved away from the gears 114, owing to the action of the toothed portions 300. When the needles are shifted for their second entry through the bag, the threads carried around and caught by the hooked ends 140 of the members 139, as shown in Fig. 36, thereby forming loops, and said members 139 retain the loops until the bag is stripped off the holding arms of the holding member. After the needles have made the second insertion through the bag and the thread has been caught a second time by the thread-catching and winding element, and as the needles withdraw from the thread-catching and winding elements, the thread cutters are thrown into operation, the hooked ends 233 elevating that portion of the thread between the needles and the thread-catching and winding elements and moving said portion of the thread against the cutting elements, (see Fig. 38) thereby severing the thread and permitting of the operation of the knotters. The lowering and lifting of the hooked end 233 of the lifting element of the thread-cutters is caused by the engaging of the arms 241, 242 with the bevel lug 239 and shoulder 240, forming a part of the lifting element. Just as the threads are being severed in a manner as stated, the thread-holder is thrown into operation to bite the thread, this action being caused by the swinging piece 104 being engaged by the element 107, which causes the shifting of the element 102; consequently biting the thread; see Fig. 13. The thread is released when the swing piece 104 is engaged by the stud 108 so as to shift the swing piece 104 clear of the element 107, and thereby moving the clamping member 102 out of its biting engagement with the thread. This release is had as the thread is being fed to the bag during the first entry of the needle. After the threads have been cut, in a manner as stated, the knotters are operated to draw the knot, and in this connection it will be stated that after the thread has been cut, the combined thread-catching and winding elements are rotated through the medium of the rollers 229 being engaged by the cam-tracks 294 of the combined cam and gear wheels, and which causes the elevation of the elements 226 carrying the coupling members 190 therewith, which in turn will elevate the bars 175 and cause the rack 174 thereof to engage the threads of the wheels 173, thereby rotating the combined thread-catching and winding elements to the position shown in Fig. 39. As the combined thread-catching and winding elements pass over the top of the carriers and loopers 176, these latter will also be moved to the position shown in Fig. 39. This action will be had by the shoulders 193 engaging the shoulders 191 and elevating the said carriers and loopers 176. At the limit of the vertical movement of the carriers and loopers 176, the lugs 185 of the knot-drawing bars 177 will be engaged by the coupling pieces 190 so as to elevate the said knot-drawing bars 177 to such position that the hooked ends thereof will be above the top of the carriers and loopers 176. At this stage, one end of the beveled toothed portions 298 will engage and shift the clutch-members 215 so as to permit of the operation of the gears 214 by the toothed portions 298 of the combined cam and gear wheels. The engaging of the toothed portions 298 with the gears 214 will rotate the cylinders 160 so as to wind the threads around the combined carriers and loopers 176, as shown in Fig. 40. At this time the rollers 213 will be engaged by the cam-tracks formed by the members 295, 296 and elevate the combined thread-catching and winding elements and the sleeves 203 to the position shown in Fig. 42, and immediately after such position of the parts is had, the bar 175 as well as the bar 177 is lowered, and the lowering of said bar 175 causes the swinging to the position shown in Fig. 44 of the combined thread-catching and winding element; and at the same time, the drawing of the knot and the severing of the loop formed by the drawing of the knot, is also shown in Fig. 44. The lowering of the bar 175 is caused by the action of the cam-tracks 294 upon the rollers 229, and after the thread-catching and winding elements are moved to the position shown in Fig. 44, they are lowered by the action of the cam-tracks formed by the members 295, 296 upon the rollers 213. It will be stated that the contour of the cam-tracks for the rollers 229, and 213 are such as to cause the elevating and lowering of the bars 175 and the thread-catching and winding elements at the proper time. After the knots have been drawn and the string completed, the strippers, bag-turning device, bag-stretching means, and the bag-sweep are operated in a manner as hereinbefore stated. After the bag has been stretched by the holding arms, the holding member is shifted to move a bag to a position to receive the strings, and such movement is had owing to the rocking of the shaft 35 in one direction, which elevates the link 34 and imparts an impulse to the element 32 which in turn will cause the dog 31 carried thereby, to engage a tooth of the ratchet 30 and move the shaft 35 so as to cause the positioning of another bag to receive the strings. When the shaft 35 rocks in an opposite direction, it will lower the element 34 therewith, and which will lower the element 32, and as the latter is loosely connected to one end of the shaft 35, it will be evident that the dog 31 will ride back over the teeth of the ratchet 30. When the rock-shaft 35 is rotated in a direction to elevate the outer end of the lever 81, said outer end will engage the cam piece 59 carried by the depending end 58 of the arm 55 and swing the said arm 55 on its pivot so as to cause it to bear against one of the holding arms 40 and shift it on its pivot so as to apply proper tension to the mouth of the bag. This action is had immediately after the holding member has been shifted to position the bag to receive the strings, and after the pairs of needle guides are shifted by the sector-shaped arms 79 to a position to straddle a pair of grippers. The arm 55 which forms a part of the bag-tensioning device is moved to an inoperative position slightly in advance of the shifting of the two pairs of needle guides in an opposite direction to release the holding member. The release of the holding member by the shifting of the two pairs of needle guides is had in advance of the shifting of the holding member so as to move the bag to a position to receive the strings. When the levers 81 and sector-shaped arms 79 are operated in a direction to move the bag-tensioning device to inoperative position and to shift the pairs of needle guides to permit of the moving of the holding member, the bag-strippers and the bag-turning device come into operation. This will be evident as when the outer ends of the levers 81 start to move downwardly, the links 82 start to move upwardly, which in turn will impart a vertical movement to the strippers and also to the bag-turner.

All the single mechanisms forming part of the machine, as well as all the duplex mechanisms, are adjustably set up so that if at any time they should be accidentally moved from some cause or another out of proper adjustment, they can be readjusted without the necessity of knocking down the entire machine or various elements thereof. Furthermore, the various mechanisms are so set up that if one should become injured, it can be very easily removed and a new one set up without going to the trouble of separating the parts of the entire machine or a plurality of such parts.

It is evident from the foregoing description, taken in connection with the accompanying drawings, that a machine is set up which will automatically and accurately insert and knot at the mouth-end of the bag, a pair of draw strings, one extending in an opposite direction with respect to the other; and that after the strings have been inserted, the bag will be turned right side out with tucked-in corners, and with the mouth stretched so that the bag will be in a position to be packed with any desirable material. It is furthermore thought that the advantages of such a machine can be fully understood, particularly in view of the fact that the stringing of the tobacco bags now in general use is done by hand, and therefore, the machine by its output will save a considerable amount of labor and expense, as will be evident.

Having thus fully described my invention, what I claim as new and desire to secure by Letters Patent, is:

1. A bag-stringing machine comprising means for inserting a pair of threads simultaneously in and looping them at the mouth-end of a bag.

2. A bag-stringing machine comprising means for simultaneously inserting a pair of oppositely-extending threads in and looping them at the mouth-end of a bag.

3. A bag-stringing machine comprising separate means operating upon opposite sides of a bag and each of which is transversely-shiftable for inserting a pair of threads in and looping them at the mouth-end of the bag.

4. A bag-stringing machine comprising separate means operating upon opposite sides of a bag and each of which is transversely-shiftable for simultaneously inserting a pair of threads in and looping them at the mouth-end of the bag.

5. A bag-stringing machine comprising means for simultaneously inserting a pair of threads in and looping them at the mouth-end of a bag, and means for knotting the ends of each of the looped threads to form a pair of draw-strings.

6. A bag-stringing machine comprising separate means operating upon opposite sides of a bag and each of which is transversely-shiftable for inserting a pair of threads in and looping them at the mouth-end of the bag, and separate means transversely-shiftable with respect to said inserting means for knotting the ends of each of the looped threads to form a pair of draw-strings.

7. A bag-stringing machine comprising separate means operating upon opposite sides of a bag and each of which is transversely-shiftable for simultaneously inserting a pair of threads in and looping them at the mouth-end of the bag, and separate means transversely-shiftable with respect to said inserting means for simultaneously knotting the ends of each of the looped threads to form a pair of draw-strings.

8. A bag-stringing machine comprising duplex means for simultaneously inserting a pair of threads in and looping them at the mouth-end of a bag, and duplex means for simultaneously knotting the ends of each of the looped threads to form a pair of draw-strings.

9. A bag-stringing machine comprising duplex means for simultaneously inserting a pair of oppositely-extending threads in and looping them at the mouth-end of a bag, and duplex means for simultaneously knotting the ends of each of the looped threads to form a pair of draw-strings.

10. A bag-stringing machine comprising means for simultaneously inserting a pair of threads in and looping them at the mouth-end of a bag turned inside out, means for simultaneously knotting the ends of each of the looped threads to form a pair of draw-strings, and means for turning the bag rightside out after the draw-strings have been formed.

11. A bag-stringing machine comprising separate means operating upon opposite sides of a bag and each of which is transversely-shiftable for inserting a pair of threads in and looping them at the mouth-end of the bag turned inside out, separate means transversely-shiftable with respect to said inserting means for knotting the ends of each of the looped threads to form a pair of draw-strings, and means for turning the bag rightside out after the draw-strings have been formed.

12. A bag-stringing machine comprising separate means operating upon opposite sides of a bag and each of which is transversely-shiftable for simultaneously inserting a pair of threads in and looping them at the mouth-end of the bag turned inside out, separate means transversely-shiftable with respect to said inserting means for simultaneously knotting the ends of each of the looped threads to form a pair of draw-strings, and means for turning the bag rightside out after the draw-strings have been formed.

13. A bag-stringing machine comprising duplex means for simultaneously inserting a pair of threads in and looping them at the mouth-end of a bag turned inside out, duplex means for simultaneously knotting the ends of each of the looped threads to form a pair of draw-strings, and means for turning the bag rightside out after the draw-strings have been formed.

14. A bag-stringing machine comprising duplex means for simultaneously inserting a pair of oppositely-extending threads in and looping them at the mouth end of a bag turned inside out, duplex means for simultaneously knotting the ends of each of the looped threads to form a pair of draw-strings, and means for turning the bag rightside out after the pair of draw-strings have been formed.

15. A bag-stringing machine comprising means for inserting a pair of threads in and looping them at the mouth-end of a bag turned inside out, means for knotting the ends of each of the looped threads to form a pair of draw-strings, means for turning the bag rightside out after the draw-strings have been formed, and means for stretching the mouth-end of the bag after the same has turned rightside out.

16. A bag-stringing machine comprising means for simultaneously inserting a pair of threads in and looping them at the mouth-end of a bag turned inside out, means for simultaneously knotting the ends of each of the looped threads to form a pair of draw-strings, means for turning the bag rightside out after the draw-strings have been formed, and means for stretching the mouth-end of the bag after the same has been turned rightside out.

17. A bag-stringing machine comprising separate means operating upon opposite sides of a bag and each of which is transversely-shiftable for inserting a pair of threads in and looping them at the mouth-end of the bag turned inside out, separate means transversely-shiftable with respect to said inserting means for knotting the ends of each of the looped threads to form a pair of draw-strings, means for turning the bag rightside out after the draw-strings have been formed, and means for stretching the mouth-end of the bag after the same has been turned rightside out.

18. A bag-stringing machine comprising separate means operating upon opposite sides of a bag and each of which is transversely-shiftable for simultaneously inserting a pair of threads in and looping them at the mouth-end of the bag turned inside out, separate means transversely-shiftable with respect to said inserting means for simultaneously knotting the ends of each of the looped threads to form a pair of draw-strings, means for turning the bag rightside out after the draw-strings have been formed, and means for stretching the mouth-end of the bag after the same has been turned rightside out.

19. A bag-stringing machine comprising means for holding a bag open under tension, and means for simultaneously inserting a pair of threads in and looping them at the mouth-end of the bag.

20. A bag-stringing machine comprising means for holding a bag open under tension, duplex means for simultaneously inserting a pair of threads in and looping them at the mouth-end of the bag, and duplex means for simultaneously knotting the ends of each of the looped threads to form a pair of draw-strings.

21. A bag-stringing machine comprising means for holding a bag open under tension, separate means operating upon opposite sides of the bag and each of which is transversely-shiftable for simultaneously inserting a pair of threads in and looping them at the mouth-end of the bag, and separate means transversely-shiftable with respect to said inserting means for simultaneously knotting the ends of each of the looped threads to form a pair of draw-strings.

22. A bag-stringing machine comprising means for holding a bag inside out under tension, means for simultaneously inserting a pair of threads in and looping them at the mouth-end of the bag, means for simultaneously knotting the ends of each of the looped threads to form a pair of draw-strings, and means for turning the bag rightside out after the draw-strings have been formed.

23. A bag-stringing machine comprising means for holding a bag inside out under tension, separate means operating upon opposite sides of the bag and each of which is transversely-shiftable for inserting a pair of threads in and looping them at the mouth-end of the bag, separate means transversely-shiftable with respect to said inserting means for knotting the ends of each of the looped threads to form a pair of draw-strings, and means for turning the bag rightside out after the draw-strings have been formed.

24. A bag-stringing machine comprising means for holding a bag inside out under tension, means for inserting a pair of threads in and looping them at the mouth-end of the bag, means for knotting the ends of each of the looped threads to form a pair of draw-strings, means for turning the bag rightside out after the draw-strings have been formed, and means for stripping the bag from said holding means simultaneously with the operation of said turning means.

25. A bag-stringing machine comprising means for holding a bag inside out under tension, means for simultaneously inserting a pair of threads in and looping them at the mouth-end of the bag, means for simultaneously knotting the ends of each of the looped threads to form a pair of draw-strings, means for turning the bag rightside out after the draw-strings have been formed, and means for stripping the bag from said holding means simultaneously with the operation of said turning means.

26. A bag-stringing machine comprising means for holding a bag inside out under tension, duplex means for simultaneously inserting a pair of threads in and looping them at the mouth-end of the bag, duplex means for simultaneously knotting the ends of each of the looped threads to form a pair of draw-strings, means for turning the bag rightside out after the draw-strings have been formed, and means for stripping the bag from said holding means simultaneously with the operation of said turning means.

27. A bag-stringing machine comprising means for holding a bag inside out under tension, separate means operating upon opposite sides of the bag and each of which is transversely-shiftable for inserting a pair of threads in and looping them at the mouth-end of the bag, separate means transversely-shiftable with respect to said inserting means for knotting the ends of each of the looped threads to form a pair of draw-strings, means for turning the bag rightside out after the draw-strings have been formed, and means for stripping the bag from said holding means simultaneously with the operation of said turning means.

28. A bag-stringing machine comprising means for holding a bag inside out under tension, means for inserting a pair of threads in and looping them at the mouth-end of the bag, means for knotting the ends of each of the looped threads to form a pair of draw-strings, means for turning the bag rightside out after the draw-strings have been formed, means for stripping the bag from said holding means simultaneously with the operation of said turning means, and means for releasing tension upon the bag simultaneously with the operation of the said turning and stripping means.

29. A bag-stringing machine comprising means for holding a bag inside out under tension, separate means operating upon opposite sides of the bag and each of which is transversely-shiftable for inserting a pair of threads in and looping them at the mouth-end of the bag, separate means transversely-shiftable with respect to said inserting means for knotting the ends of each of the looped threads to form a pair of draw-strings, means for turning the bag rightside out after the draw-strings have been formed, means for stripping the bag from said holding means simultaneously with the operation of said turning means, and means for releasing tension upon the bag simultaneously with the operation of the said turning and stripping means.

30. A bag-stringing machine, comprising an intermittently-operated bag-holding member for positioning a bag to receive a pair of draw-strings, means for simultaneously inserting a pair of threads in and looping them at the mouth-end of the bag, and means for simultaneously knotting the ends of each of the looped threads to complete the draw-strings.

31. A bag-stringing machine comprising an intermittently-operated bag-holding member for positioning a bag to receive a pair of draw-strings, separate means acting upon opposite sides of the bag and each of which is transversely-shiftable for inserting a pair of threads in and looping them at the mouth-end of the bag, and separate means transversely-shiftable with respect to said inserting means for knotting the ends of each of the looped threads to complete the draw-strings.

32. A bag-stringing machine comprising an intermittently-operated bag-holding member for positioning a bag to receive a pair of draw-strings, means for simultaneously inserting a pair of threads in and looping them at the mouth-end of the bag, means for simultaneously knotting the ends of each of the looped threads to complete the draw-strings, and means engaging the holding member for retaining the bag under tension during the stringing operation.

33. A bag-stringing machine comprising an intermittently-operated bag-holding member for positioning a bag to receive a pair of draw-strings, separate means acting upon opposite sides of the bag and each of which is transversely-shiftable for inserting a pair of threads in and looping them at the mouth-end of the bag, separate means transversely-shiftable with respect to said inserting means for knotting the ends of each of the looped threads to complete the draw-strings, and means engaging the holding member for retaining the bag under tension during the stringing operation.

34. A bag-stringing machine comprising an intermittently-operated bag-holding member for positioning a bag turned inside out to receive a pair of draw-strings, means for inserting a pair of threads in and looping them at the mouth-end of the bag, means for knotting the ends of each of the looped threads to complete the draw-strings, and means for turning the bag rightside out and stripping it from the holding member after the draw-strings have been completed.

35. A bag-stringing machine comprising an intermittently-operated bag-holding member for positioning a bag turned inside out to receive a pair of draw-strings, separate means acting upon opposite sides of the bag and each of which is transversely-shiftable for inserting a pair of threads in and looping them at the mouth-end of the bag, separate means transversely-shiftable with respect to said inserting means for knotting the ends of each of the looped threads to complete the draw-strings, and means for turn-.

ing the bag rightside out and stripping it from the holding member after the draw-strings have been completed.

36. A bag-stringing machine comprising an intermittently-operated bag-holding member for positioning a bag turned inside out to receive a pair of draw-strings, separate means acting upon opposite sides of the bag and each of which is transversely-shiftable for inserting a pair of threads in and looping them at the mouth-end of the bag, separate means transversely-shiftable with respect to said inserting means for knotting the ends of each of the looped threads to complete the draw-strings, means for turning the bag rightside out and stripping it from the holding member after the draw-strings have been completed, and means engaging the holding member for retaining the bag under tension during the stringing operation.

37. A bag-stringing machine comprising separate means operating upon opposite sides of a bag and each of which is reciprocatory and transversely-shiftable for inserting a pair of oppositely-extending threads in and looping them at the mouth-end of the bag.

38. A bag-stringing machine comprising separate means acting upon opposite sides of a bag and each of which is reciprocatory and transversely-shiftable for inserting a pair of oppositely-extending threads in and looping them at the mouth end of the bag, and means for simultaneously knotting the free ends of the looped threads to form a pair of draw-strings.

39. A bag-stringing machine comprising a means for holding a bag inside out under tension, a pair of oppositely-disposed reciprocatory and transversely - shiftable thread-inserting mechanisms for inserting a pair of oppositely - extending threads at the mouth-end of the bag, means for looping the threads during the inserting operation, means for catching the free ends of each of the looped threads and for drawing a knot in each of the threads to complete a pair of draw-strings, and means for turning the bag rightside out after the draw-strings have been completed.

40. A bag-stringing machine comprising an adjustable and intermittently operable bag holding member for positioning a bag to be strung, operating means therefor, a bag tensioning device for applying tension to the mouth end of the bag after the latter has been positioned by said member, needle guides arranged in operative relation with respect to the said member and at each side thereof, shifting means for the guides, a pair of reciprocatory and transversely shiftable needles adapted to insert the threads in the bag at the mouth end thereof and further adapted to pass through the said guides, means for transversely shifting the needles to position them with respect to the guides, a pair of reciprocatory combined thread guides and thread and needle holders, a pair of loopers for the threads, a pair of thread knotters for knotting the threads after being looped, operating means therefor, bag strippers for removing the bag from said member after the bag has been strung, operating means therefor, a combined bag turner and stretcher adapted to operate in conjunction with the strippers for turning and stretching the bag, and operating means for the combined bag turner and stretcher.

41. A bag stringing machine comprising an adjustable and intermittently operable bag holding member for positioning a bag to be strung, operating means therefor, a bag tensioning device for applying tension to the mouth end of the bag after the latter has been positioned by said member, needle guides arranged in operative relation with respect to the said member and at each side thereof, shifting means for the guides, a pair of reciprocatory and transversely shiftable needles adapted to insert the threads in the bag at the mouth end thereof and further adapted to pass through the said guides, means for transversely shifting the needles to position them with respect to the guides, a pair of reciprocatory combined thread guides and thread and needle holders, a pair of loopers for the threads, a pair of thread knotters for knotting the threads after being looped, operating means therefor, bag strippers for removing the bag from said member after the bag has been strung, operating means therefor, a combined bag turner and stretcher adapted to operate in conjunction with the strippers for turning and stretching the bag, operating means for the combined bag turner and stretcher, and a bag sweep for removing the bag from the turner and stretcher.

42. In a bag-stringing machine, an intermittently-operating bag-holding member, said member comprising a shaft, a pair of disks suitably connected thereto, radially-extending holding arms connected to the outer face of each of the disks, a roller mounted in the end of each of said arms, and a pivoted gripper extending in parallelism to each of said arms.

43. In a bag-stringing machine, an intermittently-operating bag-holding member, said member comprising a shaft, a pair of disks suitably connected thereto, radially-extending holding arms connected to the outer face of each of the disks, a roller mounted in the end of each of said arms, a pivoted gripper extending in parallelism to each of said arms, a ratchet mounted upon said shaft, a pawl adapted to engage the ratchet for rotating the shaft, and means for actuating the pawl.

44. A bag-stringing machine comprising the combination with an intermittently operable bag-holding member embodying a plurality of pivoted arms, and rotating on a longitudinally extending axis, of a swinging bag-tensioning device associating with said member and adapted to engage one of the arms for swinging it on its pivot, thereby tensioning the bag.

45. A bag-stringing machine comprising the combination with a bag-holding member embodying a plurality of pivoted arms, of a bag-tensioning device associating with said member and adapted to engage one of the arms for swinging it on its pivot, thereby tensioning the bag, said bag-tensioning device consisting of a curved arm pivoted intermediate its ends and adapted to be swung against one of the pivoted arms of the holding member and having a depending extension.

46. A bag-stringing machine comprising the combination with a bag-holding member embodying a plurality of pivoted arms, of a bag-tensioning device associating with said member adapted to engage one of the arms for swinging it on its pivot, thereby tensioning the bag, said bag-tensioning device consisting of a curved arm pivoted intermediate its ends and adapted to be swung against one of the pivoted arms of the holding member and having a depending extension, combined with means engaging with said extension for shifting the tensioning device to and from operative position.

47. A bag-stringing machine comprising a pair of thread loopers, each comprising a longitudinally-extending bar, an inverted V-shaped arm pivoted at its upper end to said bar, a depending lever arm pivoted to said bar, a coupling member connecting the lever arm and the inverted V-shaped arm together, a trip carried by the lever-arm, a spring-controlled hooked member carried by the inverted V-shaped arm, an elastic connection between the lever-arm and said bar, and means for operating said lever arm combined with means for inserting the threads at the mouth end of a bag.

48. A bag-stringing machine comprising a pair of thread loopers, each comprising a longitudinally-extending bar, an inverted V-shaped arm pivoted at its upper end to said bar, a depending lever-arm pivoted to said bar, a coupling member connecting the lever-arm and the inverted V-shaped arm together, a trip carried by the lever-arm, a spring-controlled hooked member carried by the inverted V-shaped arm, an elastic connection between the lever-arm and said bar, a movable abutment associating with said trip, and means for operating the lever arm combined with means for inserting the threads at the mouth end of a bag.

49. A bag-stringing machine, comprising a pair of reciprocatory combined thread-guide and thread and needle holders, each consisting of a reciprocatory plate, a transversely-shiftable support therefor, a clamping piece superposed upon said plate, a member mounted upon said clamping piece and provided with a pair of apertured ears through which the thread extends, a spring-pressed clamping arm pivoted to said member, a swinging piece carried by said member, combined with means for shifting the clamping arm to and from clamping position.

50. A bag-stringing machine the combination with a bag holding device, of a bag mouth-stretching device, said device consisting of a pair of pivoted hook-shaped members, and hanger rods having inclined portions engaging the said members for moving them to operative position, thereby stretching the bag-mouth, and means for moving the said members to inoperative position.

51. A bag-stringing machine, comprising a bag-holding member embodying a plurality of pairs of holding arms provided with rollers, and a gripper associating with each of the arms, each pair of said arms adapted to hold the bag to be strung turned inside out.

52. A bag-stringing machine comprising a bag-holding member embodying a plurality of pairs of holding arms provided with rollers, a gripper associating with each of the arms, each pair of said arms adapted to hold the bag to be strung turned inside out, and a pair of stripper arms and a pair of strippers adapted to engage the top edge of the bag for stripping it from the pair of holding arms.

53. A bag-stringing machine, comprising a bag-holding member embodying a plurality of pairs of holding arms provided with rollers, a gripper associating with each of the arms, each pair of said arms adapted to hold the bag to be strung turned inside out, a pair of stripper arms adapted to extend up between a pair of arms and a pair of strippers adapted to engage the top edge of the bag for stripping it from the pair of holding arms, and a bag-turning device adapted to engage the bottom of the bag and turn the bag inside out during the operation of the strippers.

54. A bag-stringing machine, comprising a bag-holding member embodying a plurality of pairs of holding arms provided with rollers, a gripper associating with each of the arms, each pair of said arms adapted to hold the bag to be strung turned inside out, a pair of stripper arms adapted to extend up between a pair of arms and a pair of strippers adapted to engage the top edge of the bag for stripping it from the pair of holding arms, a bag-turning device adapted to engage the bottom of the bag and turn the bag inside out during the operation of the strippers, and a bag-mouth stretching means carried by said bag-turning device.

55. A bag-stringing machine comprising a pair of longitudinally-shiftable needle guides, each pair of guides mounted upon a notched support and each guide of each pair of guides consisting of a block having a recess terminating in a socket, a guide-block mounted in the recess and provided with a guide channel, a shank carried by the guide-block and playing into said socket, and a coiled spring surrounding the shank, the guide-blocks of each pair of needle guides opposing each other.

56. A bag-stringing machine comprising a pair of longitudinally-shiftable needle guides, each pair of guides mounted upon the notched support and each guide of each pair of guides consisting of a block having a recess terminating in a socket, a guide-block mounted in the recess and provided with a guide channel, a shank carried by the guide-block and playing into said socket, a coiled spring surrounding the shank, the guide-blocks of each pair of needle guides opposing each other, and a depending yoke and retaining arms connected to each of the supports.

57. A bag-stringing machine embodying a pair of thread-loopers, each of said loopers consisting of a longitudinally-extending bar, an inverted V-shaped arm pivoted to said bar, a depending lever arm connected to the bar, a coupling member between said lever-arm and said inverted V-shaped arm, a trip on the lower end of said lever-arm, a spring-controlled hooked member carried by said inverted V-shaped arm, a shiftable abutment for said trip, a movable abutment for said inverted V-shaped arm, and an elastic connection between the lever-arm and the longitudinally-extending bar.

58. A bag-stringing machine comprising an adjustable and intermittently-operating bag-holding member, a bag-tensioning device associated with the bag-holding member, two pairs of transversely-shiftable needle guides, a pair of oppositely disposed reciprocatory and transversely-shiftable needles, a pair of reciprocatory combined thread-guide and thread and needle holders, a pair of loopers, a pair of thread-knotters, a pair of thread-cutters, bag strippers, a combined bag-turner and stretcher, a pair of rotatable combined cam and gear wheels, and operative connections between the said wheels, bag-holding member, needles, knotters, strippers and combined bag-turner and stretcher.

59. A bag-stringing machine comprising an intermittently-operable shaft, a pair of adjustable disks carried thereby, a plurality of radially-extending bag-holding arms carried by each of said disks, a pivoted gripper extending in parallelism with respect to each of said arms, and a roller rotatably mounted at the outer end of each of said arms.

60. A bag-stringing machine comprising an intermittently-operable shaft, a pair of adjustable disks carried thereby, a plurality of radially-extending curved bag-holding arms carried by each of said disks, the arms carried by one of the said disks being pivoted, a pivoted gripper extending in parallelism with respect to each of said arms, and a roller rotatably mounted at the outer end of each of said arms.

61. A bag-stringing machine comprising an intermittently-operable shaft, a pair of adjustable disks carried thereby, a plurality of radially-extending bag-holding arms carried by each of said disks, a pivoted gripper extending in parallelism with respect to each of said arms, and a roller rotatably mounted at the outer end of each of said arms, combined with means adapted to engage the grippers for moving them to inoperative position, and means for moving the grippers to operative position.

62. A bag-stringing machine comprising an intermittently-operable shaft, a pair of adjustable disks carried thereby, a plurality of radially-extending curved bag-holding arms carried by each of said disks, the arms carried by one of the said disks being pivoted, a pivoted gripper extending in parallelism with respect to each of said arms, and a roller rotatably mounted at the outer end of each of said arms, combined with means adapted to engage the grippers for moving them to inoperative position, and means for moving the grippers to operative position.

63. A bag-stringing machine comprising an intermittently-operable shaft, a pair of adjustable disks carried thereby, a plurality of radially-extending bag-holding arms carried by each of said disks, a pivoted gripper extending in parallelism with respect to each of said arms, a roller rotatably mounted at the outer end of each of said arms, and means engaging with the shaft for intermittently rotating it.

64. A bag-stringing machine comprising an intermittently-operable shaft, a pair of adjustable disks carried thereby, a plurality of radially-extending curved bag-holding arms carried by each of said disks, the arms carried by one of the said disks being pivoted, a pivoted gripper extending in parallelism with respect to each of said arms, a roller rotatably mounted at the outer end of each of said arms, and means engaging with the shaft for intermittently rotating it.

65. A bag-stringing machine comprising an intermittently-operable shaft, a pair of disks adjustably connected to the shaft, a plurality of radially-extending bag-holding arms carried by each of said disks, said arms substantially U-shaped in cross-section, a pivoted gripper extending in parallelism with respect to each of said arms, and a roller rotatably mounted at the outer end of each of said arms.

66. A bag-stringing machine comprising an intermittently-operable shaft, a pair of disks adjustably connected to the shaft, a plurality of radially-extending bag-holding arms carried by each of said disks, a pivoted gripper extending in parallelism with respect to each of said disks, said arms and said grippers substantially U-shaped in cross-section with the open sides of the arms opposing the open sides of the grippers, and a roller rotatably mounted at the outer ends of each of the arms.

67. A bag-stringing machine comprising an intermittently-operable shaft, a pair of disks adjustably connected to the shaft, a plurality of radially-extending curved bag-holding arms carried by each of the said disks, said arms being substantially U-shaped in cross-section and the arms carried by one of said disks being pivoted, a pivoted gripper extending in parallelism with respect to each of said arms, and a roller rotatably mounted at the outer end of each of said arms.

68. A bag-stringing machine comprising an intermittently-operable shaft, a pair of adjustable disks carried thereby, a plurality of radially-extending curved bag-holding arms carried by each of said disks, the arms carried by one of the said disks being pivoted, a pivoted gripper extending in parallelism with respect to each of said arms, said arms and said grippers substantially U-shaped in cross-section with the open sides of the arms opposing the open sides of the grippers, and a roller rotatably mounted at the outer end of each of the arms.

69. A bag-stringing machine comprising an intermittently-operable shaft, a pair of disks adjustably connected to the shaft, a plurality of radially-extending bag-holding arms carried by each of said disks, said arms substantially U-shaped in cross-section, a pivoted gripper extending in parallelism with respect to each of said arms, and a roller rotatably mounted at the outer end of each of said arms, combined with means arranged in the path of the grippers for moving them to inoperative position, and means for moving the grippers to operative position.

70. A bag-stringing machine comprising an intermittently-operable shaft, a pair of disks adjustably connected to the shaft, a plurality of radially-extending bag-holding arms carried by each of said disks, a pivoted gripper extending in parallelism with respect to each of said disks, said arms and said grippers substantially U-shaped in cross-section with the open sides of the arms opposing the open sides of the grippers, and a roller rotatably mounted at the outer ends of each of the arms, combined with means arranged in the path of the grippers for moving them to inoperative position, and means for moving the grippers to operative position.

71. A bag-stringing machine comprising an intermittently-operable shaft, a pair of disks adjustably connected to the shaft, a plurality of radially-extending curved bag-holding arms carried by each of the said disks, said arms being substantially U-shaped in cross-section and the arms carried by one of said disks being pivoted, a pivoted gripper extending in parallelism with respect to each of said arms, and a roller rotatably mounted at the outer end of each of said arms, combined with means arranged in the path of the grippers for moving them to inoperative position, and means for moving the grippers to operative position.

72. A bag-stringing machine comprising an intermittently-operable shaft, a pair of adjustable disks carried thereby, a plurality of radially-extending curved bag-holding arms carried by each of said disks, the arms carried by one of the said disks being pivoted, a pivoted gripper extending in parallelism with respect to each of said arms, said arms and said grippers substantially U-shaped in cross-section with the open sides of the arms opposing the open sides of the grippers, and a roller rotatably mounted at the outer end of each of the arms, combined with means arranged in the path of the grippers for moving them to inoperative position, and means for moving the grippers to operative position.

73. A bag-stringing machine comprising an intermittently-operable shaft, a pair of adjustable disks carried thereby, a plurality of radially-extending bag-holding arms carried by each of said disks, and a pivoted gripper extending in parallelism with respect to each of said arms.

74. A bag-stringing machine comprising an intermittently-operable shaft, a pair of adjustable disks carried thereby, a plurality of radially-extending curved bag-holding arms carried by each of said disks, the arms carried by one of the said disks being pivoted, and a pivoted gripper extending in parallelism with respect to each of said arms.

75. A bag-stringing machine comprising an intermittently-operable shaft, a pair of disks adjustably connected to the shaft, a plurality of radially-extending bag-holding arms carried by each of said disks, said arms substantially U-shaped in cross-section, and a pivoted gripper extending in parallelism with respect to each of said arms.

76. A bag-stringing machine comprising an intermittently-operable shaft, a pair of disks adjustably connected to the shaft, a plurality of radially-extending bag-holding arms carried by each of said disks, and a pivoted gripper extending in parallelism with respect to each of said disks, said arms and said grippers substantially U-shaped in cross-section with the open sides of the arms opposing the open sides of the grippers.

77. A bag-stringing machine comprising an intermittently-operable shaft, a pair of disks adjustably connected to the shaft, a plurality of radially-extending curved bag-holding arms carried by each of the said disks, said arms being substantially U-shaped in cross-section and the arms carried by one of said disks being pivoted, a pivoted gripper extending in parallelism with respect to each of said arms.

78. A bag-stringing machine comprising an intermittently-operable shaft, a pair of adjustable disks carried thereby, a plurality of radially-extending curved bag-holding arms carried by each of said disks, the arms carried by one of the said disks being pivoted, and a pivoted gripper extending in parallelism with respect to each of said arms, said arms and said grippers substantially U-shaped in cross-section with the open sides of the arms opposing the open sides of the grippers.

79. A bag-stringing machine comprising a bag-holding member having as a part thereof two sets of holding arms, each provided with a roller and one set of said arms being pivoted.

80. A bag-stringing machine comprising a bag-holding member having as a part thereof two sets of holding arms, each provided with a roller, said member further embodying two sets of grippers arranged in operative relation with respect to the said sets of holding arms.

81. A bag-stringing machine comprising a pair of stripper arms, a vertically-movable carriage, coupling members for pivotally connecting the arms to the carriage, said members provided with pins, reciprocatory shifting elements mounted in the carriage and adapted to engage the pins for swinging the said members, causing thereby the moving of said arms to and from one another, and means for actuating said elements.

82. A bag-stringing machine comprising a pair of stripper arms, a vertically-movable carriage, coupling members for pivotally connecting the arms with the carriage, shifting elements for swinging said members, causing thereby the moving of said arms to and from one another, and means for actuating said elements.

83. A bag-stringing machine comprising a pair of stripper arms, a vertically-movable carriage, coupling members for pivotally connecting the arms with the carriage, shifting elements for swinging said members causing thereby the moving of said arms to and from one another, and means arranged in the path of said elements for actuating them.

84. A bag-stringing machine comprising a pair of stripper arms, a vertically-movable carriage, guide rods therefor, coupling members for pivotally connecting the arms with the carriage, shifting elements mounted in the carriage and adapted to engage and swing said members causing thereby the moving of the arms to and from one another, and means secured to the rods and arranged in the path of said elements for shifting them.

85. A bag-stringing machine comprising a pair of stripper-arms, a vertically-movable carriage, guide-rods therefor, coupling members secured to the lower ends of said arms, pivotally connected to the carriage and provided with pins extending into the carriage, slotted shiftable elements embracing the pins, mounted in the carriage and adapted when shifted to swing said members, thereby causing the moving of the arms to and from one another, and means for shifting said elements.

86. A bag-stringing machine comprising a pair of stripper-arms, a vertically-movable carriage, guide-rods therefor, coupling members secured to the lower ends of said arms, pivotally-connected to the carriage and provided with pins extending into the carriage, slotted shiftable elements frictionally connected to the carriage and embracing said pins, and means for shifting said elements causing thereby the actuating of said members and the moving of said arms to and from one another.

87. A bag-stringing machine comprising the combination with two pairs of shiftable needle guides, a bag-tensioning device, a bag-turning device, and a bag-stripping mechanism operatively connected with said bag-turning device, of a pair of sector-shaped arms for shifting said needle guides, a lever for operating said arms and tensioning device, and an operative connection between said lever and bag-turning device for operating the latter, causing thereby the operation of the stripping mechanism.

88. A bag-stringing machine comprising the combination with two pairs of shiftable needle guides, a bag-tensioning device, a bag-turning device, and a bag-stripping mechanism operatively connected with said bag-turning device, of a pair of sector-shaped arms for shifting said needle guides, a lever for operating said arms and tensioning device, an operative connection between said lever and bag-turning device for operating the latter, causing thereby the operation of the stripping mechanism, a rock-shaft for shifting said lever, a pair of quadrants for operating the rock-shaft, and a pair of combined cam and gear-wheels provided with means engaging with the quadrants for operating them.

89. A bag-stringing machine comprising the combination with two pairs of shiftable needle guides, a bag-tensioning device, a bag-turning device, and a bag-stripping mechanism operatively connected with said bag-turning device, of a pair of sector-shaped arms for shifting said needle guides, a lever for operating said arms and tensioning device, an operative connection between said lever and bag-turning device for operating the latter, causing thereby the operation of the stripping mechanism, a rock-shaft for shifting said lever, a pair of quadrants for operating the rock-shaft, a pair of combined cam and gear-wheels provided with means engaging with the quadrants for operating them, a bag-holding member, and an operative connection between the rock-shaft and member for intermittently operating the latter.

90. A bag-stringing machine comprising a bag-holding member for positioning a bag to receive a pair of draw-strings, a pair of reciprocatory and transversely-shiftable elements operating alternately on each side of the bag and in opposite directions for inserting a pair of threads in and looping them at the mouth-end of the bag positioned by said member, a pair of transversely-shiftable knotter mechanisms adapted to knot together the ends of each of the threads to complete the draw-strings, a combined cam and gear-wheel for reciprocating one of said elements and operating one of said knotter mechanisms, a combined cam and gear wheel for reciprocating the other of said elements and operating the other of said knotter mechanisms, and means connected with said elements and knotter mechanisms and engaged by said cam and gear wheels for transversely shifting the said elements and mechanisms.

91. A bag-stringing machine comprising a bag-holding member for positioning a bag to receive a pair of draw-strings, a pair of reciprocatory and transversely-shiftable elements operating alternately on each side of the bag and in opposite directions for inserting a pair of threads into and looping them at the mouth-end of the bag positioned by said member, a pair of thread-loopers arranged in operative relation with respect to said elements, a pair of transversely-shiftable knotter mechanisms adapted to knot together the ends of each of the threads to complete the draw-strings, a combined cam and gear wheel for reciprocating one of said elements and operating one of said knotter mechanisms, a combined cam and gear-wheel for reciprocating the other of said elements and operating the other of said knotter mechanisms, and means connected with said elements and knotter mechanisms and engaged by said cam and gear-wheels for transversely shifting the said elements and mechanisms.

92. A bag-stringing machine comprising a bag-holding member for positioning a bag to receive a pair of draw-strings, a pair of reciprocatory and transversely-shiftable elements operating alternately on each side of the bag and in opposite directions for inserting a pair of threads into and looping them at the mouth-end of the bag positioned by said member, a pair of thread-loopers arranged in operative relation with respect to said elements, a pair of transversely-shiftable knotter mechanisms adapted to knot together the ends of each of the threads to complete the draw-strings, a pair of thread-cutting mechanisms arranged in operative relation with respect to said knotter mechanisms, means carried by said elements for operating the thread-cutting mechanisms, a combined cam and gear wheel for reciprocating one of said elements and operating one of said knotter mechanisms, a combined cam and gear wheel for reciprocating the other of said elements and operating the other of said knotter mechanisms, and means connected with said elements and knotter mechanisms and engaged by said cam and gear-wheels for transversely-shifting the said elements and mechanisms.

93. A bag-stringing machine comprising a bag-holding member for positioning a bag to receive a pair of draw-strings, means for applying tension to the bag when positioned to receive the strings, a pair of reciprocatory and transversely-shiftable elements operating alternately on each side of the bag and in opposite directions for inserting a pair of threads in and looping them at the mouth-end of the bag positioned by said member, said elements embodying needles and combined thread-guide and thread and needle holders, a pair of thread-loopers arranged in operative relation with respect to said elements, a pair of transversely-shiftable knotter mechanisms adapted to knot the ends of each of the threads to complete the draw-strings, a pair of thread-cutting mechanisms arranged in operative relation with respect to said knotter mechanisms, means carried by said elements for operating the thread-cutting mechanisms, a combined cam and gear-wheel for reciprocating one of said elements and operating one of said knotter mechanisms, a combined cam and gear-wheel for reciprocating the other of said elements and operating the other of said knotter mechanisms, and means connected with said elements and knotter mechanisms and engaged by said cam and gear-wheels for transversely shifting said elements and knotter mechanisms.

94. A bag-stringing machine, comprising a bag-holding member for positioning a bag to receive a pair of draw-strings, means for applying tension to the bag when positioned to receive the strings, a pair of reciprocatory and transversely-shiftable elements operating alternately on each side of the bag and in opposite direction for inserting a pair of threads in and looping them at the mouth-end of the bag positioned by said member, said elements embodying needles and combined thread-guide and thread and needle-holders, a pair of thread-loopers arranged in operative relation with respect to said elements, a pair of transversely-shiftable knotter mechanisms adapted to knot the ends of each of the threads to complete the draw-strings, a pair of thread-cutting mechanisms arranged in operative relation with respect to said knotter mechanisms, means carried by said elements for operating the thread-cutting mechanisms, a bag-turning device, a bag-stripping mechanism operatively connected with said bag-turning device, a combined cam and gear-wheels for reciprocating one of said elements and operating one of said knotter mechanisms, a combined cam and gear-wheel for reciprocating the other of said elements and operating the other of said knotter mechanisms, means connected with said elements and knotter mechanisms and engaged by said cam and gear-wheels for transversely-shifting the said elements and knotter mechanisms, and means connected with said device and engaged by said cam and gear-wheels for operating the bag-turning device, thereby throwing into operation the bag-stripping mechanism.

95. A bag-stringing machine comprising a bag-holding member for positioning a bag to receive a pair of draw-strings, means for applying tension to the bag when positioned to receive the strings, a pair of reciprocatory and transversely shiftable elements operating alternately on each side of the bag and in opposite directions for inserting a pair of threads in and looping them at the mouth-end of the bag positioned by said member, said elements embodying needles and combined thread-guide and thread and needle-holders, a pair of thread-loopers arranged in operative relation with respect to said elements, a pair of transversely-shiftable knotter mechanisms adapted to knot the ends of each of the threads to complete the draw-strings, a pair of thread-cutting mechanisms arranged in operative relation with respect to said knotter mechanism, means carried by said elements for operating the thread-cutting mechanisms, a bag-turning device, a bag-stripping mechanism operatively connected with said bag-turning device, two pairs of longitudinally-shiftable needle-guides arranged in operative relation with respect to said elements and holding member, a combined cam and gearwheel for reciprocating one of said elements and operating one of said knotter mechanisms, a combined cam and gearwheel for reciprocating the other of said elements and operating the other of said knotter mechanisms, means connected with said elements, thread-guides and knotter mechanisms and engaged by said cam and gear-wheels for shifting the said elements, guides and knotters, and means connected with said device and engaged by said cam and gearwheels for operating the bag-turning device, thereby throwing into operation the bag-stripping mechanism.

96. A bag-stringing machine comprising a bag-holding member for positioning a bag to receive a pair of drawstrings, means for applying tension to the bag when positioned to receive the strings, a pair of reciprocatory and transversely-shiftable elements operating alternately on each side of the bag and in opposite directions for inserting a pair of threads in and looping them at the mouth-end of the bag positioned by said member, said elements embodying needles and combined thread-guide and thread and needle-holders, a pair of thread-loopers arranged in operative relation with respect to said elements, a pair of transversely-shiftable knotter mechanisms adapted to knot the ends of each of the threads to complete the drawstrings, a pair of thread-cutting mechanisms arranged in operative relation with respect to said knotter mechanism, means carried by said elements for operating the thread-cutting mechanisms, a bag-turning device, a bag-stripping mechanism operatively connected with said bag-turning device, two pairs of longitudinally-shiftable needle-guides arranged in operative relation with respect to said elements and holding member, a combined cam and gear-wheel for reciprocating one of said elements and operating one of said knotter mechanisms, a combined cam and gear-wheel for reciprocating the other of said elements and operating the other of said knotter mechanisms, means connected with said elements, thread-guides and knotter mechanisms and engaged by said cam and gear-wheels for shifting the said elements, guides and knotters, means connected with said device and engaged by said cam and gear-wheels for operating the bag-turning device, thereby throwing into operation the bag-stripping mechanism, a stretching means carried by said bag-turning device, operating means for said stretching means, and a bag-sweep arranged in operative relation with respect to said bag-turning-device.

97. A bag-stringing machine comprising a pair of reciprocatory and transversely-shiftable needles to insert threads at opposite sides of a bag-mouth,—said needles reciprocating in an opposite direction with respect to each other, and means for shifting the needles transversely, causing the needles to alternately pass through each side of the bag-mouth.

98. A bag stringing machine comprising the combination with means for inserting threads in the mouth end of a bag, of a pair of thread loopers each comprising a longitudinally extending bar, a V-shaped element pivoted at its upper end to said bar, a depending lever arm pivoted to the bar, a coupling member connecting the lever arm and the V-shaped element together, a trip carried by the lever arm, a spring controlled hooked member carried by the V-shaped element, an elastic connection between the lever arm and bar, and means for operating the lever arm.

99. In a bag stringing machine, the combination with means for inserting threads in the mouth end of a bag, of a pair of thread loopers, each comprising a longitudinally extending bar, a V-shaped element pivoted to the bar, a depending lever arm, a coupling member connecting the lever arm and the V-shaped element together, a trip carried by the lever arm, a spring controlled hooked member carried by the V-shaped element, an elastic connection between the lever arm and said bar, a movable abutment associating with the trip, and means for operating the lever arm.

100. A bag stringing machine comprising a pair of reciprocatory combined thread guides and thread and needle holders, each consisting of a reciprocatory plate, a transversely shiftable support therefor, a clamping piece superposed upon said plate, a member mounted upon the clamping piece, and through which the thread extends, a spring pressed clamping arm pivoted to the said member, and a swinging piece carried by said arm, combined with means for shifting the clamping arm to and from clamping position.

In testimony whereof I have hereunto set my hand in presence of two subscribing witnesses.

JOHN T. DALTON.

Witnesses:
T. G. POOL,
JAS. B. WILBORN.